(12) United States Patent
Weber et al.

(10) Patent No.: US 6,697,195 B2
(45) Date of Patent: Feb. 24, 2004

(54) LOSS ENHANCED REFLECTIVE OPTICAL FILTERS

(75) Inventors: Michael F. Weber, Shoreview, MN (US); Roger J. Strharsky, Woodbury, MN (US); Timothy J. Nevitt, Red Wing, MN (US); Andrew J. Ouderkirk, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/185,582

(22) Filed: Jun. 28, 2002

(65) Prior Publication Data

US 2002/0186474 A1 Dec. 12, 2002

Related U.S. Application Data

(63) Continuation of application No. 07/642,717, filed on Aug. 21, 2000, now abandoned.

(51) Int. Cl.⁷ ............................ G02B 5/08; G02B 1/10; F21V 9/04
(52) U.S. Cl. .................. 359/359; 359/350; 359/589; 359/584
(58) Field of Search ................. 359/350, 359, 359/488, 501, 498, 584

(56) References Cited

U.S. PATENT DOCUMENTS

| | | |
|---|---|---|
| 540,768 A | 6/1895 | Western |
| 3,124,639 A | 3/1964 | Kahn |
| 3,610,729 A | 10/1971 | Rogers |
| 3,711,176 A | 1/1973 | Alfrey, Jr. et al. |
| 3,756,692 A | 9/1973 | Scott |
| 3,860,036 A | 1/1975 | Newman, Jr. |
| 4,282,290 A | 8/1981 | Pellicori et al. |
| 4,446,305 A | 5/1984 | Rogers et al. |
| 4,520,189 A | 5/1985 | Rogers et al. |
| 4,521,588 A | 6/1985 | Rogers et al. |
| 4,525,413 A | 6/1985 | Rogers et al. |
| 4,659,523 A | 4/1987 | Rogers et al. |
| 4,720,426 A | 1/1988 | Englert et al. |
| 4,830,441 A | 5/1989 | Chang |
| 4,895,769 A | 1/1990 | Land et al. |
| 4,900,137 A * | 2/1990 | Carter ....................... 359/350 |
| 5,134,421 A | 7/1992 | Boyd et al. |
| 5,188,760 A | 2/1993 | Hikmet et al. |
| 5,198,911 A | 3/1993 | Ning |
| 5,211,878 A | 5/1993 | Reiffenrath et al. |
| 5,235,443 A | 8/1993 | Barnik et al. |
| 5,269,995 A | 12/1993 | Ramanathan et al. |
| 5,294,657 A | 3/1994 | Melendy et al. |
| 5,316,703 A | 5/1994 | Schrenk |

(List continued on next page.)

FOREIGN PATENT DOCUMENTS

| | | |
|---|---|---|
| AU | 622812 | 3/1991 |
| DE | 36 20 989 A | 1/1988 |
| DE | 39 20 043 A1 | 3/1991 |

(List continued on next page.)

OTHER PUBLICATIONS

Berning, Peter H. and Turner, A.F., "Induced Transmission in Absorbing Films Applied to Band Pass Filter Design," Journal of the Optical Society of America, vol. 47, No. 3, Mar. 1957.

(List continued on next page.)

*Primary Examiner*—Audrey Chang
(74) *Attorney, Agent, or Firm*—Bruce E. Black

(57) ABSTRACT

Optical filters and their manufacture, as well as the use of the optical filters in optical devices, such as polarizers and mirrors are described. The optical filters typically include a first reflective multilayer film, a second reflective multilayer film, and a lossy element disposed between the first and second reflective multilayer films.

15 Claims, 15 Drawing Sheets

U.S. PATENT DOCUMENTS

| | | |
|---|---|---|
| 5,319,478 A | 6/1994 | Fiinfschilling et al. |
| 5,389,324 A | 2/1995 | Lewis et al. |
| 5,448,404 A | 9/1995 | Schrenk et al. |
| 5,463,494 A * | 10/1995 | Hobrock .................... 359/359 |
| 5,486,935 A | 1/1996 | Kalmanash |
| 5,486,949 A | 1/1996 | Schrenk et al. |
| 5,493,442 A | 2/1996 | Buchholz et al. |
| 5,506,704 A | 4/1996 | Broer et al. |
| 5,539,544 A | 7/1996 | Le Paih et al. |
| 5,612,820 A | 3/1997 | Schrenk et al. |
| 5,629,055 A | 5/1997 | Revol et al. |
| 5,686,979 A | 11/1997 | Weber et al. |
| 5,691,789 A | 11/1997 | Li et al. |
| 5,699,188 A | 12/1997 | Gilbert et al. |
| 5,721,603 A | 2/1998 | De Vaan et al. |
| 5,744,534 A | 4/1998 | Ishiharada et al. |
| 5,751,388 A | 5/1998 | Larson |
| 5,767,935 A | 6/1998 | Ueda et al. |
| 5,770,306 A | 6/1998 | Suzuki et al. |
| 5,783,120 A | 7/1998 | Ouderkirk et al. |
| 5,793,456 A | 8/1998 | Broer et al. |
| 5,808,794 A | 9/1998 | Weber et al. |
| 5,825,542 A | 10/1998 | Cobb, Jr. et al. |
| 5,825,543 A | 10/1998 | Ouderkirk et al. |
| 5,828,488 A | 10/1998 | Ouderkirk et al. |
| 5,882,774 A | 3/1999 | Jonza et al. |
| 5,940,149 A | 8/1999 | Vanderwerf |
| 5,962,114 A | 10/1999 | Jonza et al. |
| 5,965,247 A | 10/1999 | Jonza et al. |
| 6,021,001 A | 2/2000 | Turner |
| 6,157,490 A | 12/2000 | Wheatley et al. |
| 6,268,961 B1 | 7/2001 | Nevitt et al. |

FOREIGN PATENT DOCUMENTS

| | | |
|---|---|---|
| DE | 43 32 042 C | 3/1995 |
| EP | 0 609 593 A1 | 10/1994 |
| EP | 0 940 705 | 9/1999 |
| FR | 2 626 981 | 8/1989 |
| FR | 2 645 971 | 10/1990 |
| GB | 1 305 700 | 2/1973 |
| WO | WO 95/27919 | 4/1995 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01440 | 1/1997 |
| WO | WO 97/01774 | 1/1997 |
| WO | WO 97/01788 | 1/1997 |
| WO | WO 97/01789 | 1/1997 |
| WO | WO 99/36248 | 7/1999 |
| WO | WO 99/36258 | 7/1999 |
| WO | WO 99/36262 | 7/1999 |
| WO | WO 99/36809 | 7/1999 |
| WO | WO 00/07046 | 10/2000 |
| WO | WO 01/75490 | 10/2001 |
| WO | WO 01/79923 | 10/2001 |

OTHER PUBLICATIONS

MacLeod, "Thin Film Optical Filters," Adam Hilger Ltd: London (1969).

Schrenk et al., Nanolayer polymeric optical films, Tappi Journal, pp. 169–174, Jun., 1992.

Thelen, Alfred, "Design of Optical Interference Coatings," McGraw–Hill, Inc., 1989, Chapters 6–7 and 9–10.

Weber et al., "Giant Birefringent Optics in Multilayer Polymer Mirrors", Science, vol. 287, Mar. 31, 2000, pp. 2451–2456.

Corion Catalogue: Optical Filters and Coatings, $2^{nd}$ Edition, 1998 XP002191767.

* cited by examiner

LOSS ENHANCED REFLECTIVE OPTICAL FILTERS

This application is a continuation of U.S. patent application Ser. No. 09/642,717 filed on Aug. 21, 2000 now abandoned.

FIELD OF THE INVENTION

The present invention relates to optical filters and methods of making and using the optical filters. In addition, the present invention is directed to optical filters that include both reflective and lossy elements and methods of making and using such optical filters.

BACKGROUND OF THE INVENTION

Optical filters, including, for example, optical mirrors and polarizers, can be used in a variety of devices to perform a variety of functions. In many of these optical filters, a portion of the light incident on the device is reflected or absorbed and another portion of the light is transmitted. For example, an IR filter reflects or absorbs IR light while passing visible light. As another example, a polarizer reflects light having one polarization over a particular wavelength band and transmits light having the orthogonal polarization.

A number of parameters can be used to describe the optical properties of optical filters. Transmission, T, (or absorption or reflection) of a wavelength or wavelength range to be absorbed or reflected can describe the amount of light leaking through an optical filter. Optical density is defined as $-\log_{10} T$, and is particularly useful for comparing low transmission optical filters. In some applications, optical densities of 4 (corresponding to 0.01% transmission) or greater may be desired or required.

Another parameter is the sharpness of the band edge (e.g., the transition from a high transmission wavelength range to a low transmission wavelength range). For at least some applications, it may be desirable or required to have a change of 2.5 or more in optical density over a wavelength range of 5, 10, or 20 nm or less.

Absorptive optical bodies have been used for many of these applications. Typically, these optical bodies include an absorptive material deposited on or within a substrate (e.g., a glass or polymer substrate). Such absorptive optical bodies are often characterized by their percent absorptance, referring to the percentage of light that is absorbed in a single pass through the optical body. Unfortunately, absorptive materials typically do not have sharp, broadband absorption spectra. Generally, absorptive materials at least partially absorb light within the desired transmission wavelength range or polarization and are not very wavelength selective. For example, an absorptive IR or UV filter will also typically absorb a portion of the visible light. To increase the IR or UV absorption results in more absorption of visible light. For applications such as, for example, eyewear or window treatments, this phenomenon can limit how much IR or UV protection can be obtained based on the visibility requirements. In addition, the visible absorption is typically non-uniform, which can result in a colored appearance.

Broadband reflective optical bodies can be made using, for example, multilayer thin film techniques. The wavelength range of these optical bodies is typically a function of the range of thicknesses of the layers. The reflectivity of these optical bodies is improved by using more layers of each thickness. To obtain highly reflective, broadband optical bodies generally requires the controlled formation of a large number of thin films. As more layers are needed to obtain the desired optical parameters, the cost and difficulty in making the optical body increases.

SUMMARY OF THE INVENTION

Generally, the present invention relates to optical filters and their manufacture, as well as the use of the optical filters in optical devices, such as polarizers and mirrors. One embodiment is an optical filter that includes a first reflective multilayer film, a second reflective multilayer film, and a lossy element disposed between the first and second reflective multilayer films. The first and second multilayer reflective films each have an optical density, for unpolarized light, of at least 1 over the same wavelength range. The wavelength range has a width of at least 50 nm. The lossy element, in the absence of the first and second multilayer reflective films, causes the loss of, on average, at least 5% of light in that wavelength range. In addition, the present invention is related to the method of filtering light through this optical filter, as well as the other optical filters and articles described below.

Another embodiment is an optical filter that includes a first reflective element, a second reflective element, and a lossy element disposed between the first and second reflective elements. The second reflective element has a band edge within about 25 nm of a band edge of the first reflective element. The lossy element causes the loss of at least some light within the band edge of at least one of the first and second reflective elements. In some instances, the band edge of the lossy element is within at least 25 nm of a band edge of the first or second reflective elements. In some instances, two or more of the band edges overlap.

Yet another embodiment is an optical filter that includes a first reflective multilayer film, a second reflective multilayer film, and a lossy element disposed between the first and second reflective multilayer films. The first and second multilayer reflective films define a reflection wavelength range in which the first and second multilayer reflective films, in the absence of the lossy element, have an optical density of at least 1.5 for unpolarized light. The lossy element, in the absence of the first and second multilayer reflective films, has an optical density for unpolarized light of at least 0.1 over the reflection wavelength range.

Another embodiment is an optical filter that includes a first reflective multilayer film, a second reflective multilayer film, and a lossy element disposed between the first and second reflective multilayer films. The optical film has an optical density of at least 2 over a first wavelength range of at least 50 nm and has an optical density of no more than 0.3 over a second wavelength range of at least 50 nm. The lossy element, in the absence of the first and second multilayer reflective films, absorbs on average at least 5% of light in the first wavelength range.

A further embodiment is an article that includes at least one transparent substrate and an optical film disposed over a major surface of the substrate. The optical film has a first multilayer reflective film, a second multilayer reflective film, and a lossy element disposed between the first and second multilayer reflective films.

The above summary of the present invention is not intended to describe each disclosed embodiment or every implementation of the present invention. The Figures and the detailed description which follow exemplify several embodiments.

BRIEF DESCRIPTION OF THE DRAWINGS

The invention may be more completely understood in consideration of the following detailed description of various embodiments of the invention in connection with the accompanying drawings, in which.

Figure 1:
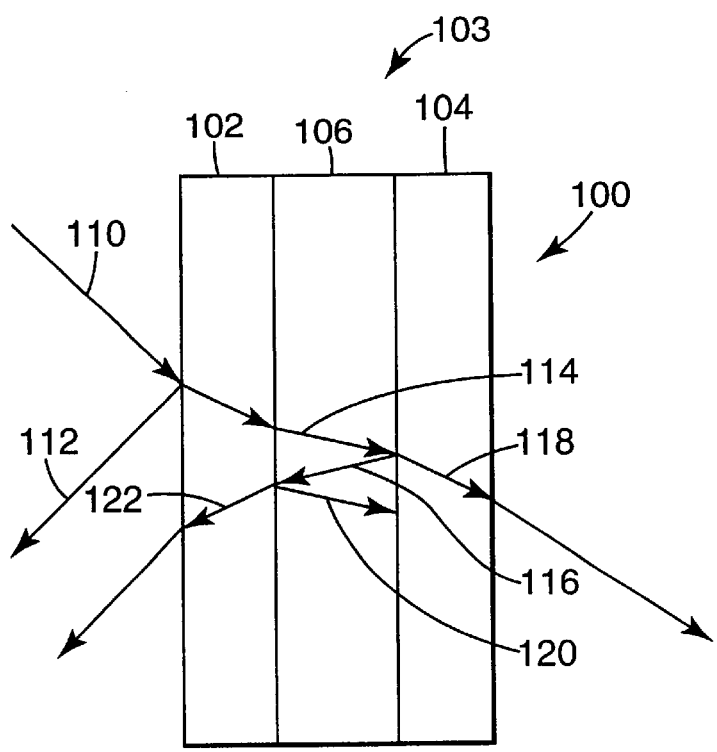
FIG. 1 is a cross-sectional view of one embodiment of an optical filter, according to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF ILLUSTRATIVE EMBODIMENTS

The present invention is believed to be applicable to optical filters and their manufacture, as well as to the use of the optical filters in optical devices, such as polarizers and mirrors. While the present invention is not so limited, an appreciation of various aspects of the invention will be gained through a discussion of the examples provided below.

Figure 2:
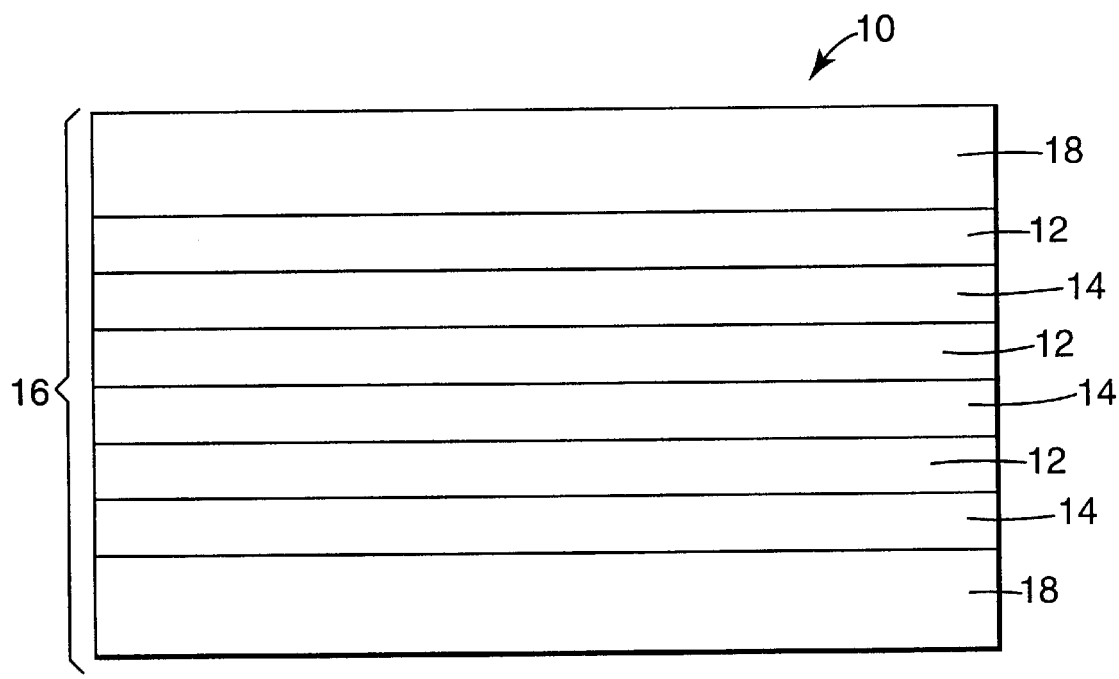
FIG. 2 is a cross-sectional view of one embodiment of a multilayer optical film, according to the invention.

Indices of refraction, $n_x$, $n_y$, $n_z$, for layers in a multilayer film, such as that illustrated in FIG. 2, correspond to mutually perpendicular axes that are selected so that x and y axes are in the plane of the layer and the z axis is normal to that plane.

A material having the same refractive index regardless of the polarization state of light (e.g., linearly polarized along the x-, y-, or z-axis, right- or left-circularly polarized, or elliptically polarized in specified orientations) is said to be "isotropic". Otherwise, the material is said to be "birefringent". If a material has refractive indices, $n_x$, $n_y$, and $n_z$ with exactly two of these indices being equal, the material is said to be "uniaxially birefringent". If these three refractive indices are all different, the material is said to be "biaxially birefringent".

The term "in-plane birefringence" will be understood to be the absolute value of the difference between the in-plane indices of refraction, $n_x$ and $n_y$.

The term "polymer" will be understood to include both polymers and copolymers (formed using two or more monomers), as well as polymers or copolymers which can be formed in a miscible blend by, for example, coextrusion or reaction, including transesterification. Both block and random copolymers are included, unless indicated otherwise.

Unless otherwise specified, the term "band edge" refers to a portion of the optical density spectrum of the optical filter where there is a substantially steady increase in the optical density from high to low transmission or a substantially steady decrease in the optical density from low to high transmission. It will be understood that there can be some ripple in the increase or decrease in optical density associated with the band edge.

The range of transmission for the band edge will typically vary depending on the application and the materials used for the elements of the optical filter. For example, for many reflective elements, the low transmission value (in units of optical density) can be 0.1, 0.3, 0.5, 0.7, or 1. The high transmission value (in units of optical density) can be, for example, 1, 2, or 4. Examples of band edge ranges include 0.1 to 1, 0.3 to 2, or 0.3 to 4. For absorptive and other lossy elements, the low transmission values (in units of optical density) can be, for example, 0, 0.05, 0.1, or 0.3. The high transmission values (in units of optical density) can be, for example, 0.5, 1, 1.5, 2, or 4. Examples of band edge ranges for absorptive and other lossy elements include 0 to 0.5, 0 to 1, 0.05 to 1, 0.1 to 1, 0.3 to 1, and 0.3 to 2.

All birefringence and index of refraction values are reported for 632.8 nm light, unless otherwise indicated.

The optical filters described herein are useful as, for example, mirrors and polarizers, depending, at least in part, on the materials selected for the optical filter and the configuration of elements in the optical filter. Generally, the optical filter includes a lossy element disposed between two reflective elements. FIG. 1 depicts one embodiment of an optical filter 100 illustrating basic elements. Additional elements can be added or the basic elements modified. The optical filter 100 includes a first reflective element 102, a second reflective element 104, and an absorptive element 106. The first and second reflective elements 102, 104 can be the same or different.

The absorptive element 106 is one type of lossy element. The absorptive element can be replaced or used with other lossy elements including, for example, lossy elements that employ mechanisms such as scattering to increase light extinction. It will be understood that the design considerations discussed herein regarding the use of an absorptive element can be adapted by those of skill in the art to other lossy elements.

The first and second reflective elements and the absorptive element can be formed as a unitary structure, as illustrated in FIG. 1. For example, the three elements (or any two of the elements) can be fastened, adhesively mounted together using an optical adhesive, coextruded, simultaneously or sequentially coated onto a substrate (not shown), or otherwise coupled. Alternatively, one or more of the elements can be spaced apart from the others.

Typically, when light 110 is directed toward the optical filter 100, a portion 112 of the light is reflected and the remainder 114 of the light is transmitted by the first reflective element 102. The transmitted light 114 travels through the absorptive element 106 where a portion of the light is absorbed. The unabsorbed light then encounters the second reflective element 104 where a portion 116 of the light is reflected and the remainder 118 of the light is transmitted. The reflected light 116 travels back through the absorptive element 106 where, again, a portion of the light is absorbed. The light 116 then encounters the first reflective element 102, where a portion 120 of the light is reflected and a portion 122 of the light is transmitted, and so on.

Generally, the first and second reflective elements 102, 104 are selected to reflect light over a particular reflection bandwidth or light having a particular reflection polarization. However, these reflective elements do allow some light within the reflection bandwidth or having the reflection polarization to be transmitted (e.g., leak) through the elements. The absorptive element is typically selected to absorb at least a portion of the light that leaks through these elements.

Generally, the configuration of FIG. 1 will result in higher optical density (OD) than can be obtained using the reflective elements or absorptive elements alone or in a combination of two elements (e.g., two reflective elements or one reflective element and one absorptive element) or in a combination of three elements other than having an absorptive element between two reflective elements.

Optical density is defined as $$OD = -\log_{10} I_t/I_0,$$

where $I_t$ is the intensity of light transmitted through the optical filter and $I_0$ is the intensity of light incident on the optical filter for a desired bandwidth or at a particular wavelength. The configuration of FIG. 1 results in more absorption of light by the absorptive element because of the extended light path (e.g., path 116, 120) due to back-reflection of the light into the absorptive element by the reflective elements.

Using a simple model that accounts for the multiple reflections, where phase relationships are ignored or averaged and the reflective elements are assumed to be non-absorptive, the transmission, T, by the optical filter for a particular wavelength, λ, is given by the expression:

$$T = \frac{(1-R_1)(1-R_2)\exp(-\alpha h)}{1 - R_1 R_2 \exp(-2\alpha h)}$$

where $R_1$ is the reflectivity of the first reflective element for λ, $R_2$ is the reflectivity of the second reflective element for λ, h is the thickness of the absorptive element, and α is the absorptivity of the absorptive element and is given according to Beer's Law:

$$I = I_0 e^{-\alpha h}$$

where $I_0$ is the intensity of light incident on the absorptive element, I is the intensity of light after traveling a distance h through the absorptive element, $$\alpha = \frac{4\pi n''}{\lambda},$$

and n" is the imaginary portion of the complex index of refraction of the absorptive element for the wavelength, λ. A similar expression can be developed for the reflectivity, R, of the optical filter:

$$R = \frac{R_1 + R_2(1-2R_1)\exp(-2\alpha h)}{1 - R_1 R_2 \exp(-2\alpha h)}.$$

And the absorption of the optical filter, A, is given by the expression:

$$A = 1 - R - T.$$

Using this simple model, the transmission, reflection, and absorption of various optical filters can be estimated. For example, for a particular wavelength, with reflective elements having 98% reflectivity and an absorptive element having 50% absorptance (i.e., exp(−αh)=0.5), the combination of two reflective elements would have 1.01% transmission and the combination of a reflective element and an absorptive element would have 1% transmission. In both instances, the optical density is about 2. In contrast, the optical filter of FIG. 1 would have, according to this model, about 0.02% transmission corresponding to an optical density of about 3.7.

This synergistic combination of an absorptive element between two reflective elements results in an increase in optical density and absorption performance that can not be achieved with either type of element alone or with elements arranged in other combinations. It will be noted that additional enhancement can be achieved by adding additional absorptive or reflective elements, preferably, in an alternating manner (e.g., adding a second absorptive element between the second reflective element and a third reflective element).

Figure 3:
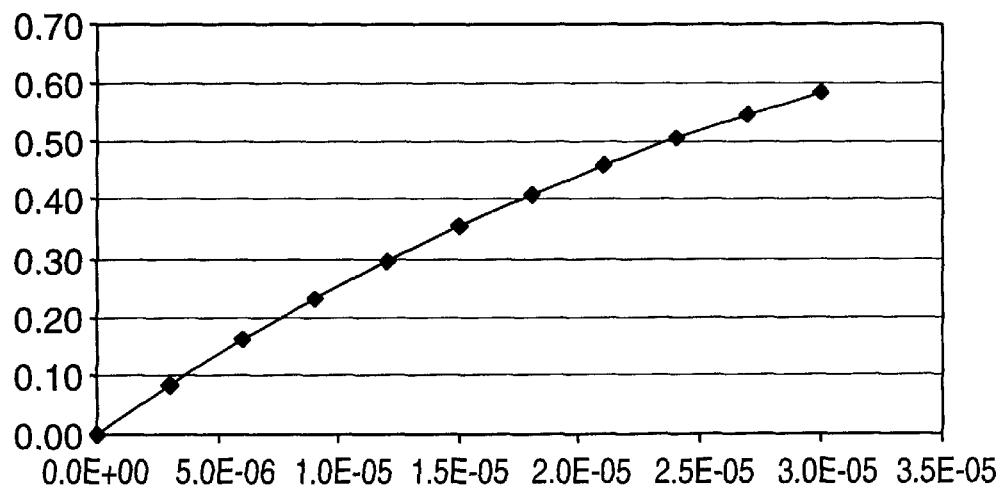
FIG. 3 is a graph of fractional absorption (y-axis) of incident light versus the imaginary part of the refractive index (x-axis) of an absorptive material according to Beer's law, where the thickness of the absorptive element is 2.1 mm and the wavelength of light is 900 nm, n" varies from 0 to $8\times10^{-5}$.

Beer's Law predicts the effects of absorption in a layer. When the reflective elements 102, 104 are removed from the structure shown in FIG. 1, only a simple absorptive element 106 is left. An example of how increasing the imaginary part of the refractive index n" affects the percentage of light that is absorbed in a single pass through the layer is provided in FIG. 3.

Figure 4:
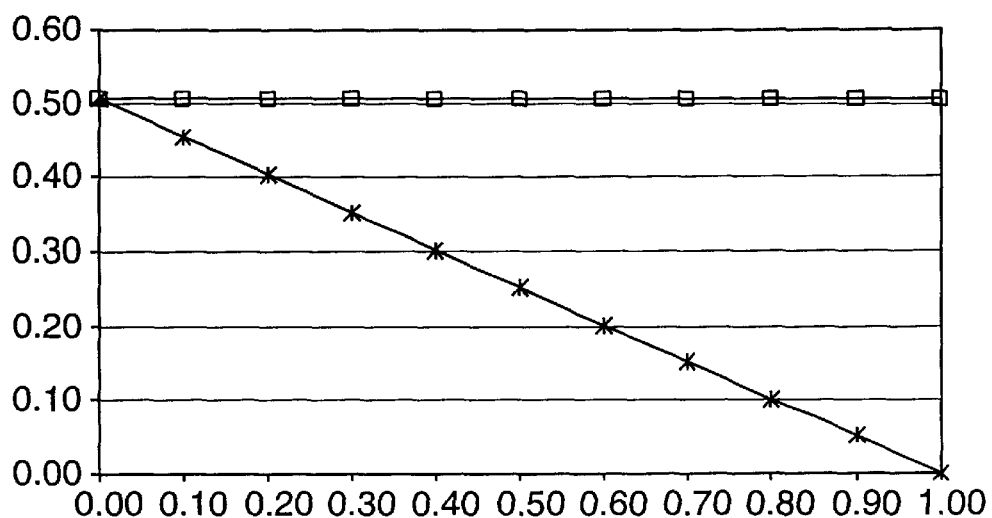
FIG. 4 is a graph of fractional absorption (asterisks) and normalized absorption (squares) versus reflectivity (x-axis) for an absorptive element of an optical body having a reflective element disposed in front of the absorptive element, where the thickness of the absorptive element is 2.1 mm, the wavelength of light is 900 nm, and the imaginary part of the index of refraction of the absorptive element is $2.4\times10^{-5}$.

To quantitatively describe the level of enhanced absorption in an optical filter containing both absorptive and reflective elements, it is useful first to develop a measure of absorption efficiency in such a system. When an optical filter includes a reflective element 102 and an absorptive element 106, without the additional reflective element 104, the amount of incident light available for absorption is diminished by the amount of light reflected by the reflective element 102. Thus, a good measure of the absorption efficiency of the absorptive element is to define normalized absorption, $A_{norm}$, as the absorption of the optical filter A normalized by the transmission level of the reflective element, T (i.e., $A_{norm}$=A/T), which is placed in front of the absorptive element. This assumes that there is no absorptive loss in the reflective element. With this definition, the effect of the reflective element in preventing light from reaching the absorptive element, is normalized for the determination of absorption efficiency of the absorptive element. This is demonstrated below in FIG. 4, where the absorptive element has a thickness of 2.1 mm with n"=2.4×10$^{-5}$, and the reflective element 102 has reflectivity as given in the x-axis of FIG. 4.

Figure 5:
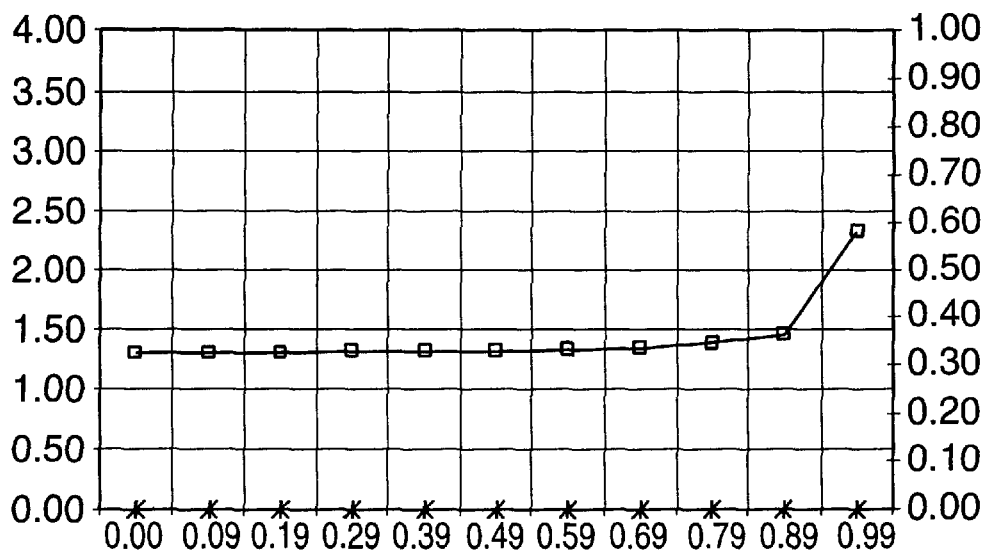
FIG. 5 is a graph of optical density (left y-axis, squares) and normalized absorption (right y-axis, asterisks) versus reflectivity (x-axis) of a second reflective element of an optical body having a first reflective element with a reflectivity of 0.95 and no absorptive element between the first and second reflective elements.
Figure 6:
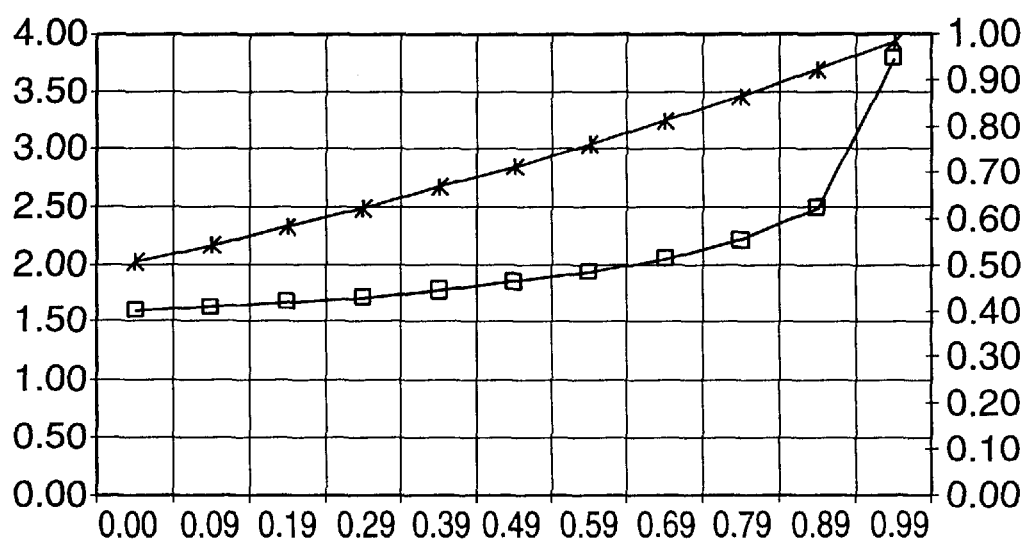
FIG. 6 is a graph of optical density (left y-axis, squares) and normalized absorption (right y-axis, asterisks) versus reflectivity (x-axis) of the second reflective element 104 of the optical filter of FIG. 1 with the first reflective element 102 having a reflectivity of 0.95 and the absorptive element 106 having an absorptance of 0.50.

FIGS. 5 and 6 demonstrate how the effective absorption and optical density for the optical filter in FIG. 1 depend on the reflectivity of the reflective elements 102 and 104 and on the properties of the absorptive element 106. FIG. 5 demonstrates that when there is no absorptive element, the two reflective elements combine to only marginally increase optical density as the second reflective element increases in strength. In this case, the normalized absorption is, of course, zero. However, as shown in FIG. 6, when the absorptive element absorbs light at, for example, 50% absorptance, the increase in the reflectivity of the second reflective element 104 has a dramatic affect on optical density and normalized absorption. Optical density increases to a value of 4 with nearly 90% normalized absorption for a reflective element combination of 0.95 reflectivity (reflective element 102) and 0.99 reflectivity (reflective element 104).

Figure 7:
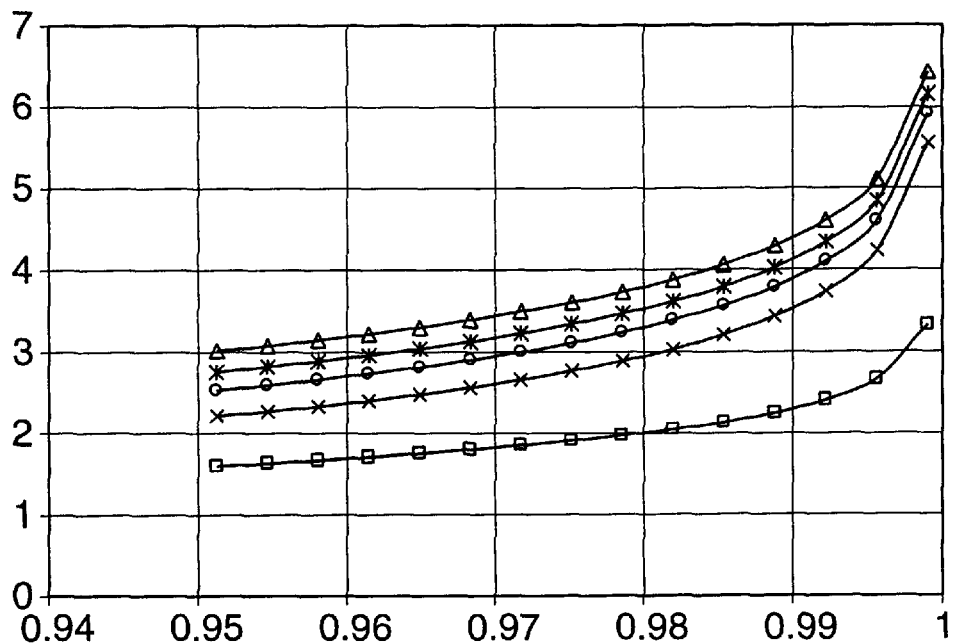
FIG. 7 is a graph of optical density (y-axis) versus reflectivity (x-axis) of reflective elements 102, 104 of the optical filter of FIG. 1 for different absorptance values of the absorptive element 106 (squares=0% absorptance, X's=15% absorptance, circles=30% absorptance, asterisks=45% absorptance, triangles=60% absorptance)
Figure 8:
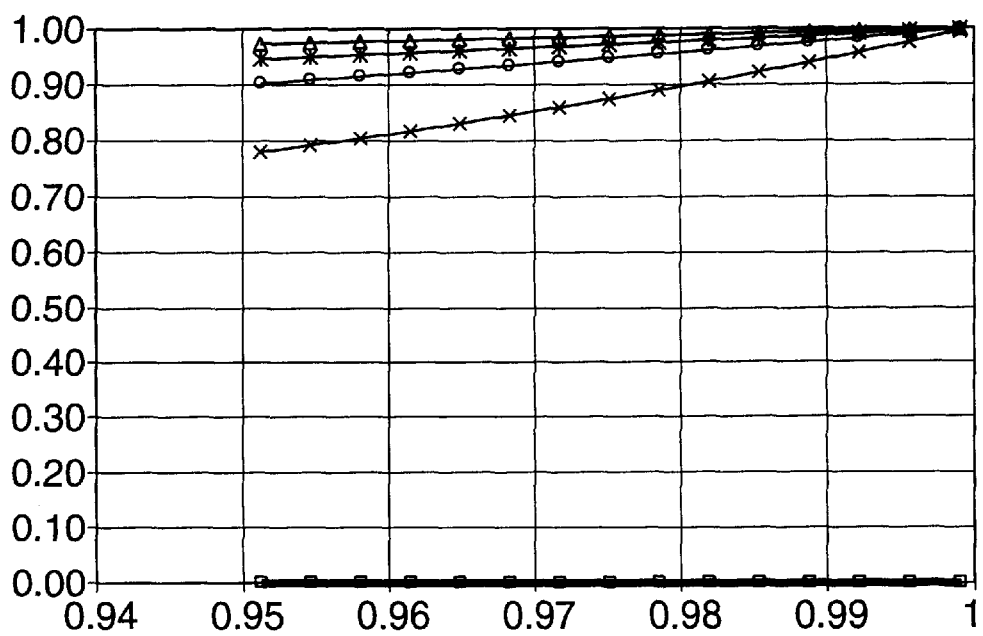
FIG. 8 is a graph of normalized absorption (y-axis) versus reflectivity (x-axis) of reflective elements 102, 104 of the optical filter of FIG. 1 for different absorptance values of the absorptive element 106 (squares=0% absorptance, X's=15% absorptance, circles=30% absorptance, asterisks=45% absorptance, triangles=60% absorptance)

FIGS. 7 and 8 show a family of estimated performance curves for the optical filter of FIG. 1, where the reflective elements 102, 104 have a range of reflectivity, for differing levels of absorptance in the absorptive element 106. FIG. 7 shows the optical density performance, while FIG. 8 shows the normalized absorption of the absorptive element sandwiched between the two reflective elements.

The optical filters are useful in a variety of applications, particularly for filtering out unwanted light. For example, the optical filters can be used as IR, UV, or visible light filters or polarizers. Examples of products that could benefit from the use of these optical filters include items, such as, UV or IR sensitive films or other objects, polarizing eyewear and windows, laser protective eyewear, and high extinction polarizers for electronic information displays.

Reflective Elements

Although generally any reflective element will work, the preferred reflective elements for a variety of applications are multilayer optical films. Examples of suitable multilayer optical films include inorganic multilayer optical films, polymeric multilayer optical films, and multiple pitch cholesteric liquid crystal films. These multilayer optical films can have one or more of the following characteristics which can make them particularly suited for a variety of applications: lightweight, flexible, formable, good off-angle color, low haze, and high transmission outside the reflected wavelength range.

FIG. 2 illustrates a multilayer optical film 10, such as a polymeric or inorganic multilayer optical film, which can be used, for example, as an optical polarizer or mirror. The film 10 includes one or more first optical layers 12, one or more second optical layers 14, and, optionally, one or more non-optical layers 18. The non-optical layers 18 can be disposed on a surface of the optical film as, for example, a skin layer or disposed between optical layers to, for example, provide support during or after manufacture.

The first and second optical layers 12, 14 are selected so that at least one in-plane index of refraction of the first optical layers 12 is different than the index of refraction (in the same direction) of the second optical layers 14. The optical layers 12, 14 and, optionally, one or more of the non-optical layers 18 are typically interleaved to form a stack 16 of layers. Typically the optical layers 12, 14 are arranged as alternating pairs, as shown in FIG. 2, to form a series of interfaces between layers with different optical properties. The optical layers 12, 14 are typically no more than 2 μm thick and, in some embodiments, are no more than 1 μm thick.

Although FIG. 2 shows only six optical layers 12, 14, multilayer optical films 10 can have a large number of optical layers. Examples of suitable multilayer optical films include those having about 2 to 5000 optical layers. Generally, multilayer optical films have about 25 to 2000 optical layers and typically about 50 to 1500 optical layers or about 75 to 1000 optical layers. It will be appreciated that, although only a single stack 16 is illustrated in FIG. 2, the multilayer optical film 10 can be made from multiple stacks that are subsequently combined to form the film 10. Additional sets of optical layers, similar to the first and second optical layers 12, 14, can also be used in the multilayer optical film 10. The design principles disclosed herein for the sets of first and second optical layers can be applied to any additional sets of optical layers.

Typically, the highest reflectivity for a particular interface occurs at a wavelength corresponding to twice the combined optical thickness of the pair of optical layers 12, 14 which form the interface. The optical thickness describes the difference in path length between light rays reflected from the lower and upper surfaces of the pair of optical layers. For light incident at 90 degrees to the plane of the optical film (normally incident light), the optical thickness of the two layers is $n_1 d_1 + n_2 d_2$ where $n_1$, $n_2$ are the in-plane indices of refraction of the two layers and $d_1$, $d_2$ are the thicknesses of the corresponding layers. This equation can be used to tune the optical layers for normally incident light using the in-plane indices of refraction for each layer. At other angles, the optical distance depends on the distance traveled through the layers (which is larger than the thickness of the layers) and the indices of refraction for at least two of the three optical axes of the layer. Details regarding oblique incident light can be found in Weber et al., *Science*, 287, 5462 (2000), incorporated herein by reference. The layers 12, 14 can each be a quarter wavelength thick or the layers 12, 14 can have different optical thicknesses, as long as the sum of the optical thicknesses is half of a wavelength (or an odd multiple thereof). A film having more than two optical layers can include optical layers with different optical thicknesses to increase the reflectivity of the film over a range of wavelengths. For example, a film can include pairs or sets of layers that are individually tuned to achieve optimal reflection of normally incident light having particular wavelengths. In some embodiments, the layers of the multilayer reflective element have a thickness gradient. The thickness gradient can be monotonically increasing or decreasing or the gradient can have increasing and decreasing thickness regions.

The reflective wavelength range of the reflective element can be selected for the application. The reflective wavelength range can be characterized as the range of wavelengths for which the optical density (of the reflective element alone) at the majority of wavelengths exceeds a threshold value. Preferably, the optical density of at least 80%, more preferably, at least 90%, and most preferably, at least 95% of the wavelengths in the reflective wavelength range exceed the threshold value. In some embodiments, for example, in at least some laser protection applications, the optical density of 100% of the wavelengths in the reflective wavelength range exceeds the threshold value. The threshold value of the optical density typically depends, at least in part, on the application and the other components (e.g., the absorptive element) of the optical filter. For example, the threshold value of the optical density could be selected to be at least 1, 1.5, 2, 2.5, 3, or more. The size of the wavelength range will depend on the materials used to make the reflective and adsorptive elements, as well as their thickness and arrangement of layers. Optical filters can be made with reflective wavelength ranges of at least 50, 100, 200, and 400 nm.

Typically, reflective films used in IR filters will have a reflective wavelength range that includes some portion of the range of 700 to 5000 nm, and preferably some portion of the range of 780 to 1200 nm. For UV filters, the reflective wavelength range typically includes at least a portion of the range from 200 to 410 nm.

When an optical filter is constructed to reflect both polarizations of light, the in-plane indices of refraction of the first optical layers are typically substantially different from the respective in-plane indices of refraction of the second optical layers. In one example, the first and second optical layers have different isotropic indices of refraction. In another example, the first optical layers, second optical layers, or both are birefringent and the in-plane indices of refraction of the first optical layers are different from the respective in-plane indices of refraction of the second optical layers.

On the other hand, an optical filter can be constructed to preferentially reflect one polarization of light (e.g., an optical filter that substantially reflects light having one polarization and substantially transmits light having an orthogonal polarization). The first optical layers, the second optical layers, or both are birefringent in this embodiment. Typically, for these optical filters, one in-plane index of refraction of the first optical layers is substantially the same as a respective in-plane index of refraction of the second optical layers.

Inorganic multilayer optical films are described in, for example, H. A. Macleod, *Thin-Film Optical Filters, 2nd Ed.*, Macmillan Publishing Co. (1986) and A. Thelan, *Design of Optical Interference Filters*, McGraw-Hill, Inc. (1989), both of which are incorporated herein by reference.

Polymeric multilayer optical films for use in optical filters are described in, for example, PCT Publication Nos. WO95/17303; WO95/17691; WO95/17692; WO95/17699; WO96/19347; and WO99/36262, all of which are incorporated herein by reference. One commercially available form of a multilayer reflective polarizer is marketed as Dual Brightness Enhanced Film (DBEF) by 3M, St. Paul, Minn. Polymeric multilayer optical films are generally formed using alternating layers of polymer materials with different indices of refraction. Typically, any polymer can be used as long as the polymer is relatively transparent over the wavelength range of transmission. For polarizing applications, the first optical layers, the second optical layers, or both are formed using polymers that are or can be made birefringent. Birefringent polymers can also be used in non-polarizing applications, as well.

Some polymers, including many polyesters, as described in, for example, PCT Publication Nos. WO95/17303; WO95/17691; WO95/17692; WO95/17699; WO96/19347; and WO99/36262, can be made birefringent by, for example, stretching a layer (or, more typically, the entire optical film) made using the polymer in a desired direction or directions. The polymer layers can be uniaxially-oriented by, for example, stretching the layer or film in a single direction. A birefringent, uniaxially-oriented film typically exhibits a difference between the transmission and/or reflection of incident light rays having a plane of polarization parallel to the oriented direction (i.e., stretch direction) and light rays having a plane of polarization parallel to a transverse direction (i.e., a direction orthogonal to the stretch direction). For example, when an orientable polyester film is stretched along the x axis, the typical result is that $n_x \neq n_y$, where $n_x$ and $n_y$ are the indices of refraction for light polarized in a plane parallel to the "x" and "y" axes, respectively. The degree of alteration in the index of refraction along the stretch direction will depend on factors such as, for example, the amount of stretching, the stretch rate, the temperature of the film during stretching, the thickness of the film, the variation in the film thickness, and the composition of the film. In other embodiments, the first optical layers 12 can be biaxially-oriented by stretching the film in two different directions. The stretching of optical layers 12 in the two directions can result in a net symmetrical or asymmetrical stretch in the two chosen orthogonal axes.

A polarizing optical film can be made by combining a uniaxially-oriented first optical layer 12 with a second optical layer 14 having an isotropic index of refraction that is approximately equal to one of the in-plane indices of the oriented layer. Alternatively, both optical layers 12, 14 are formed from birefringent polymers and are oriented in a multiple draw process so that the indices of refraction in a single in-plane direction are approximately equal. The reflectivity can be increased by increasing the number of layers or by increasing the difference in the indices of refraction between the first and second optical layers 12, 14.

One example of the formation of a non-polarizing optical film is the combination of a biaxially-oriented optical layer 12 with a second optical layer 14 having indices of refraction which differ from both the in-plane indices of the biaxially-oriented layer. The optical film operates by reflecting light having either polarization because of the index of refraction mismatch between the two optical layers 12, 14. Such optical films can also be made using a combination of uniaxially-oriented layers with in-plane indices of refraction which differ significantly. There are other methods and combinations of layers that are known for producing both mirrors and polarizers which may be used. Those particular combinations discussed above are examples.

Cholesteric liquid crystal optical films are described in, for example, U.S. Pat. No. 5,793,456, U.S. Pat. No. 5,506,704, U.S. Pat. No. 5,691,789, and European Patent Application Publication No. EP 940 705, all of which are incorporated herein by reference. One cholesteric reflective polarizer is marketed under the tradename TRANSMAX™ by Merck Co. Cholesteric liquid crystal optical films substantially reflect light having one circular polarization (e.g., left or right circularly polarized light) and substantially transmit light having the other circular polarization (e.g., right or left circularly polarized light) over a particular bandwidth of light wavelengths. This characterization describes the reflection or transmission of light directed at normal incidence to the director of the cholesteric liquid crystal material. Light that is directed at other angles will typically be elliptically polarized by the cholesteric liquid crystal material.

The pitch of a cholesteric liquid crystal optical film is an important factor in determining the center wavelength and the spectral bandwidth of the light reflected by the cholesteric liquid crystal. The pitch for these optical films is analogous to layer thickness in the polymeric and inorganic multilayer optical films. Using multiple pitch values over a range typically increases the bandwidth of the optical film. Cholesteric liquid crystal optical films with multiple pitch values (to, for example, increase bandwidth) can be formed, for example, by stacking cholesteric liquid crystal optical films made using different materials or different combinations of the same materials. An alternative is to form the optical film by varying the pitch through each of one or more layers. The different values of pitch act as different optical layers which reflect different wavelengths of light making the multiple pitch cholesteric liquid crystal optical films analogous to a multilayer optical film.

In addition, the thickness of the cholesteric liquid crystal layer at a particular pitch is analogous to the number of layers in the polymeric and inorganic multilayer optical films. Typically, thicker cholesteric liquid crystal layers result in higher reflectivity.

Absorptive Elements

Generally, any optically absorbing structure can be used as the absorptive element depending, at least in part, on the desired wavelengths of absorption and transmission. One example of an absorptive element includes a light absorbing material, such as, for example, dye, pigment, or ink disposed in a supporting matrix or on a supporting substrate. For example, the light absorbing material can be disposed in a polymer or glass matrix or on a polymer or glass substrate.

Suitable absorptive elements include glass filters, such as those obtainable from Schott Glass Technologies, Inc., Duryea, Pa., including the KG series of heat control filters which absorb strongly in the near infrared but are relatively transparent in the visible. Gentex Corporation (Carbondale, Pa.) makes plastic optical filters under the trade name Filtron™. In addition, polycarbonate or acrylic sheets loaded with dyes absorb at various wavelengths across the visible and IR. A variety of IR and visible absorbing dyes are available from Epolin, Inc. (Newark, N.J.). The Epolite™ series includes dyes with good thermal stability that can be injection molded with, for example, polycarbonate. Other dyes have broad solubility and are recommended for solution coating. Alternative absorbing materials include pigments such as carbon black and iron oxides. These could be loaded into a glass or polymer host matrix. Examples include iron oxide-loaded glass, such as Optifloat™ Blue 21, Optifloat™ Green 58, and Optifloat™ Green 90 glass available from Pilkington, plc (St. Helens, Great Britain).

The selection of the light absorbing material can be made based on factors, such as, for example, the absorbance spectrum of the light absorbing material, cost, processibility, stability, and compatibility with other elements in the optical filter. Preferably, a light absorbing material is selected with an average absorptance of at least about 5%, 10%, 20%, 30%, or 50% over the wavelength range that is to be reflected/absorbed. More preferably, the light absorbing material has a relatively low average absorptance (e.g., no more than 40%, 20%, 10%, 5%, or 1%) over the wavelength range where transmission is desired. It will be appreciated, however, that many light absorbing materials suitable for broadband absorptive elements have substantial absorbance over a relatively wide range of wavelengths or a relatively constant absorptance value over portions of both the transmission and reflection wavelength ranges. The use of the combination of an absorptive element between two reflective elements can allow the use of lower loadings of light absorbing material than if the absorptive element was used alone or with a single reflective element. The combination illustrated in FIG. 1 will typically result in lower absorption at wavelengths where transmission is desired.

For polarizing applications, polarizing absorptive elements are useful. Polarizing absorptive elements preferentially transmit one polarization of light. One particularly useful polarizing absorptive element is an oriented, dye-containing, polyvinyl alcohol (PVA) film. Examples of such films and their use as polarizing absorptive elements is described, for example, in U.S. Pat. Nos. 4,895,769, and 4,659,523 and PCT Publication No. WO 95/17691, all of which are incorporated herein by reference. To function as an absorptive polarizer, the polyvinyl alcohol film is typically stretched to orient the film. When stained with a polarizing dye or pigment, the orientation of the film determines the optical properties (e.g., the axis of extinction) of the film.

Other Lossy Elements

Other lossy elements can be used, including, for example, lossy elements that employ scattering or a combination of scattering and absorption. For example, depending on particle size, pigments or other particles used in the optical filters can scatter light rays. Although this may introduce additional haze, a scattering loss is typically equivalent to an absorptive loss. Generally, scattering is only slowly wavelength dependent and is typically stronger for shorter wavelengths. Scattering can be polarization dependent based on the shape of the scattering particles.

Other Elements and Coatings

Various functional layers or coatings can be added to the optical filters of the present invention to alter or improve their physical or chemical properties, particularly along the surface of the optical filter. Such layers or coatings can include, for example, slip agents, low adhesion backside materials, conductive layers, antistatic coatings or films, barrier layers, flame retardants, UV stabilizers, abrasion resistant materials, optical coatings, and/or substrates designed to improve the mechanical integrity or strength of the film or device, as described in WO 97/01440, which is herein incorporated by reference. Other coatings and layers include anti-fogging coatings (e.g., UV cured silicon polymer such as Photogard™ from 3M Company, St. Paul, Minn.) and holographic reflectors as described, for example, in U.S. Pat. Nos. 4,830,441 and 5,198.911, both of which are incorporated herein by reference.

Filters

The optical filters can be used to absorb/reflect light over a particular wavelength range or having a particular polarization. Such filters can be used, for example, to remove harmful IR or UV light while passing visible light. The low transmission wavelength range of the optical filter can be selected for the application. The low transmission wavelength range can be characterized as the range of wavelengths for which the optical density (of the reflective element alone) at the majority of wavelengths exceeds a threshold value. Preferably, the optical density of at least 80%, more preferably, at least 90%, and most preferably, at least 95% of the wavelengths in the reflective wavelength range exceed the threshold value. In some embodiments, for example, in at least some laser protection applications, the optical density of 100% of the wavelengths in the low transmission wavelength range exceeds the threshold value. For example, the threshold value of the optical density could be selected to be at least 1, 1.5, 2, 2.5, 3, or more. The size of the low transmission wavelength range will depend on the materials used to make the reflective and adsorptive elements, as well as their thickness and arrangement of layers. Optical filters can be made with low transmission wavelength ranges of at least 50, 100, 200, and 400 nm.

To obtain the enhanced filtering effects herein, there will be at least some overlap of the reflective wavelength regions of the first and second reflective elements 102, 104. This overlap will typically be at least 50 nm wide. In some embodiments, the overlap is 100 nm, 300 nm, 500 nm, or 1000 nm or more wide. Generally, the absorptive element 106 will absorb light over at least part of the overlap of the reflective wavelength regions and, at least in some embodiments, over the entire overlap. Within the overlapping region of the reflective wavelength regions, the reflective elements typically each have optical densities of, for example, 1, 1.5, 2, or more over this overlapping region. The absorptive element can have an optical density of 0.1, 0.3, 0.5, 1, or more within the overlapping region. The optical densities of these elements will typically depend on the application and the materials used in the particular element. The following are examples illustrating some uses of the optical filters. Sharp Band edge Filters Some applications of optical films, such as, for example, filtering applications, can require or benefit from a sharp reflective or absorptive band edge (e.g., a sharp change from highly reflective or absorptive to highly transmissive over a narrow wavelength range, such as, for example, 10, 20, or 30 nm). As an illustrative example, infrared fiber optic devices can require that a filter selectively reflect and transmit light having wavelengths that are separated by, for example, 5, 10, or 20 nm. This places stringent burdens on the filter by requiring high extinction or reflection at one wavelength and high transmission at a closely spaced wavelength.

Figure 9:
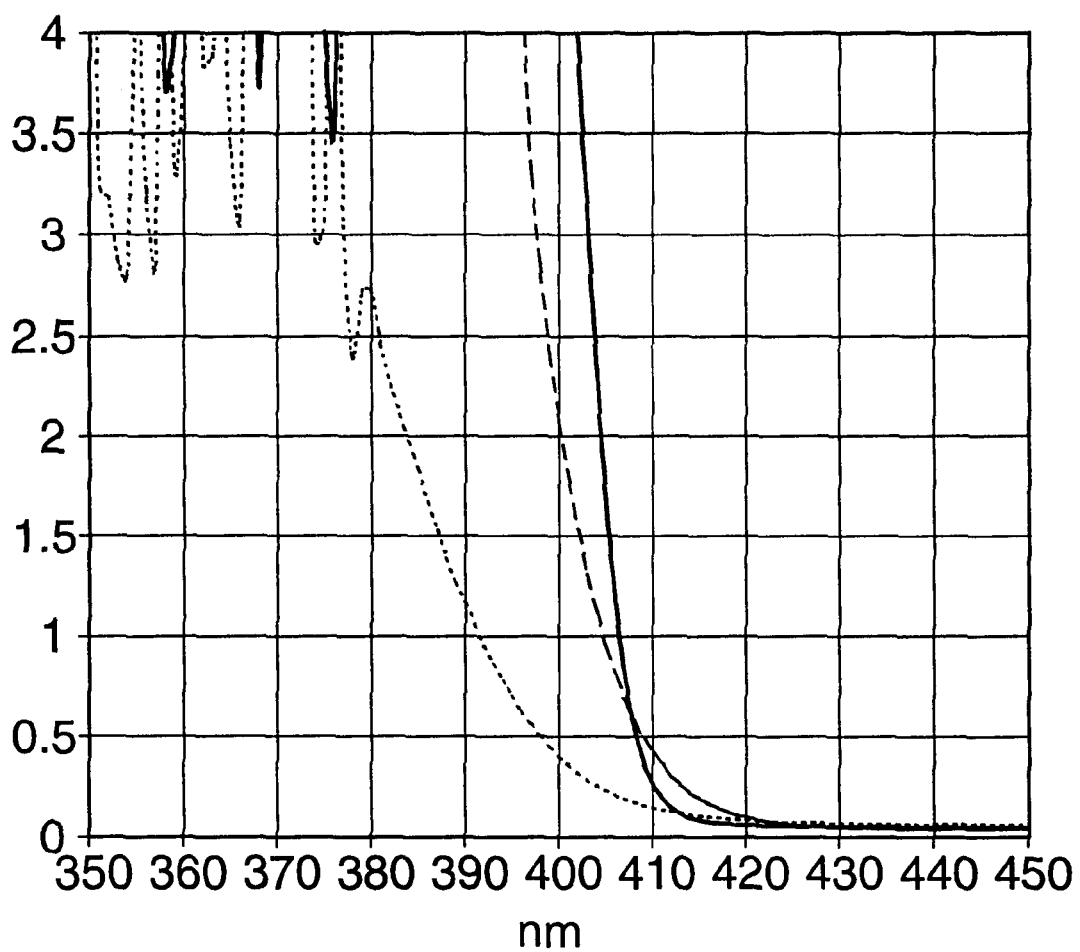
FIG. 9 is a graph of the optical density (y-axis) versus wavelength (x-axis) for three commercial UV absorbers: Corning 8510 filter (Corning, Inc., Corning, N.Y.) (solid line); UF-5 acrylic ⅛" filter (ELF-Atochem, Philadelphia, Pa.) (dashed line); and UVNUL 3050 (BASF, Portsmouth, Va.) (dotted line)

As another illustrative example, ultraviolet (UV) filters can be used to block UV light to, for example, prevent degradation of underlying materials. Preferably, the UV filter blocks at least 99% (and, more preferably, at least 99.99%) of light at 410 nm and lower. A number of conventional filters that achieve this goal have absorption/reflection tails that extend for at least 10 to 40 nm into the visible light wavelengths. FIG. 9 illustrates the absorption spectrum of several commercial UV absorbing filters illustrating the absorption tail. Although the absorption/reflection in the blue wavelengths may be low, even this amount can give the filter a yellow appearance which can be aesthetically unattractive and, in some instances, functionally detrimental.

Sharp band edge filters can be formed by selecting first and second reflective elements that have a band edge extending near (e.g., within 50, 20, or 10 nm) each other. The absorptive element typically has at least 5%, 10%, 30%, 50%, or 60% absorptance near (e.g., within 50, 25, or 10 nm) the desired band edge. The term "band edge" refers to a portion of the optical density spectrum of the optical filter where there is a substantially steady increase in the optical density from low to high transmission or a substantially steady decrease in the optical density from high to low transmission. It will be understood that there can be some ripple in the increase or decrease in optical density associated with the band edge.

The range of transmission for the band edge will typically vary depending on the application and the materials used for the elements. For example, for many reflective elements, the low transmission value will generally be 0.1, 0.3, 0.5, 0.7, or 1. The high transmission value will be, for example, 1, 2, or 4. Examples of ranges include 0.1 to 1, 0.3 to 2 or 0.3 to 4. For absorptive and other lossy elements, the low transmission values will generally be 0, 0.05, 0.1, or 0.3. The high transmission values will be 0.5, 1, 1.5, 2, or 4. Examples of ranges include 0 to 0.5, 0 to 1, 0.05 to 1, 0.1 to 1, 0.3 to 1, and 0.3 to 2.

In some embodiments, the optical density at the band edge has an average change of 1 unit over 20, 10, 5, or 1 nm. As an alternative, the band edge can be defined as the wavelength at which the transmission is, for example, 50% or 10%.

The distance between band edges (in nm) of different elements corresponds to the smallest difference between wavelengths of the two band edges. Generally, to obtain a sharp band edge, the band edges of the two reflective elements 102, 104 are within 10, 25, or 50 nm of each other. In some instances, two band edges can overlap where the wavelength ranges of the two band edges overlap. Preferably, the band edge of at least one of the reflective elements (and, more preferably, both of the reflective elements) is separated from the band edge of the absorptive element by no more than 10, 25, or 50 nm or the band edges overlap.

Figure 10:
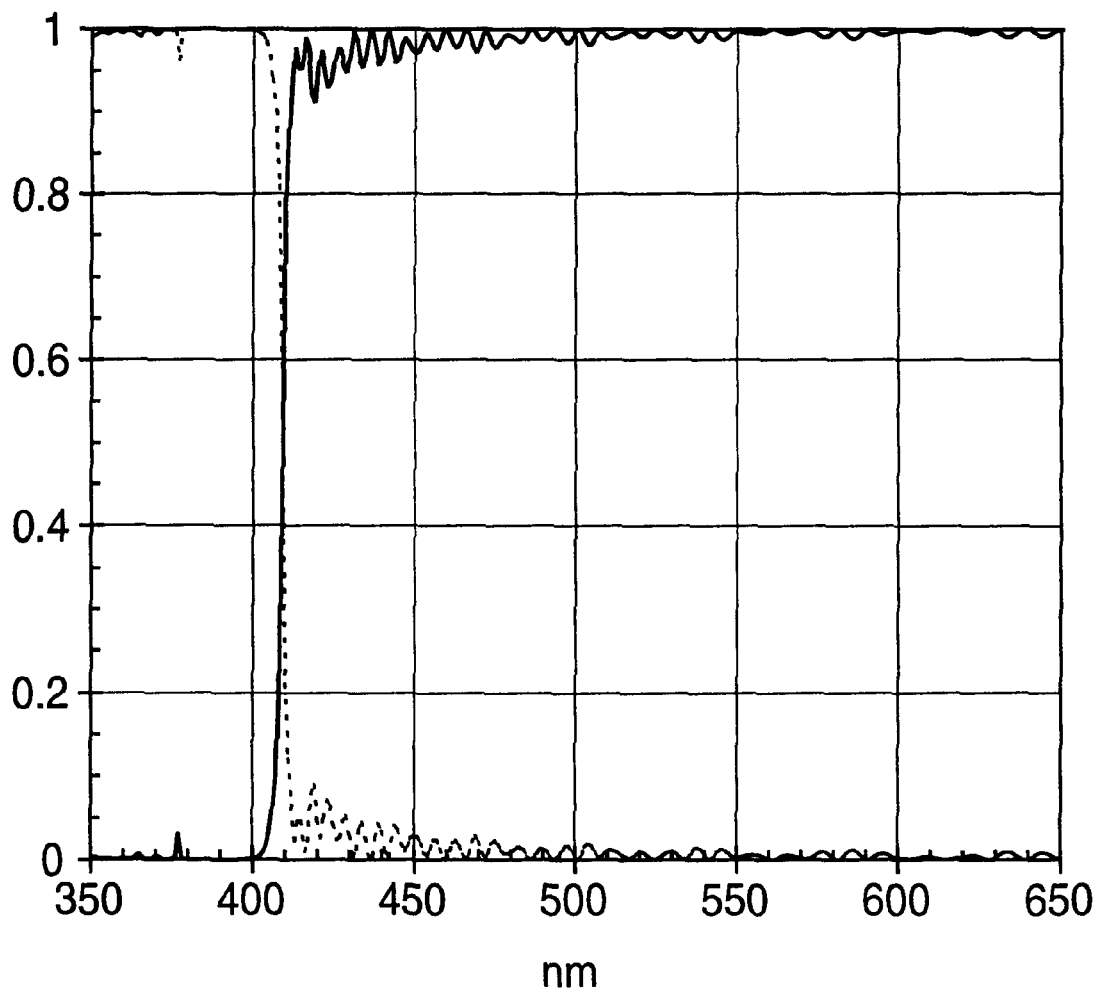
FIG. 10 is a graph of modeled transmission (solid line) and reflection (dotted line) versus wavelength (x-axis) for a 10.6 μm thick multilayer optical film with 180 alternating layers of polyethylene terephthalate and poly(ethylene-co-vinyl(acetate)) with a thickness gradient 103.5 to 125.7 nm.
Figure 11:
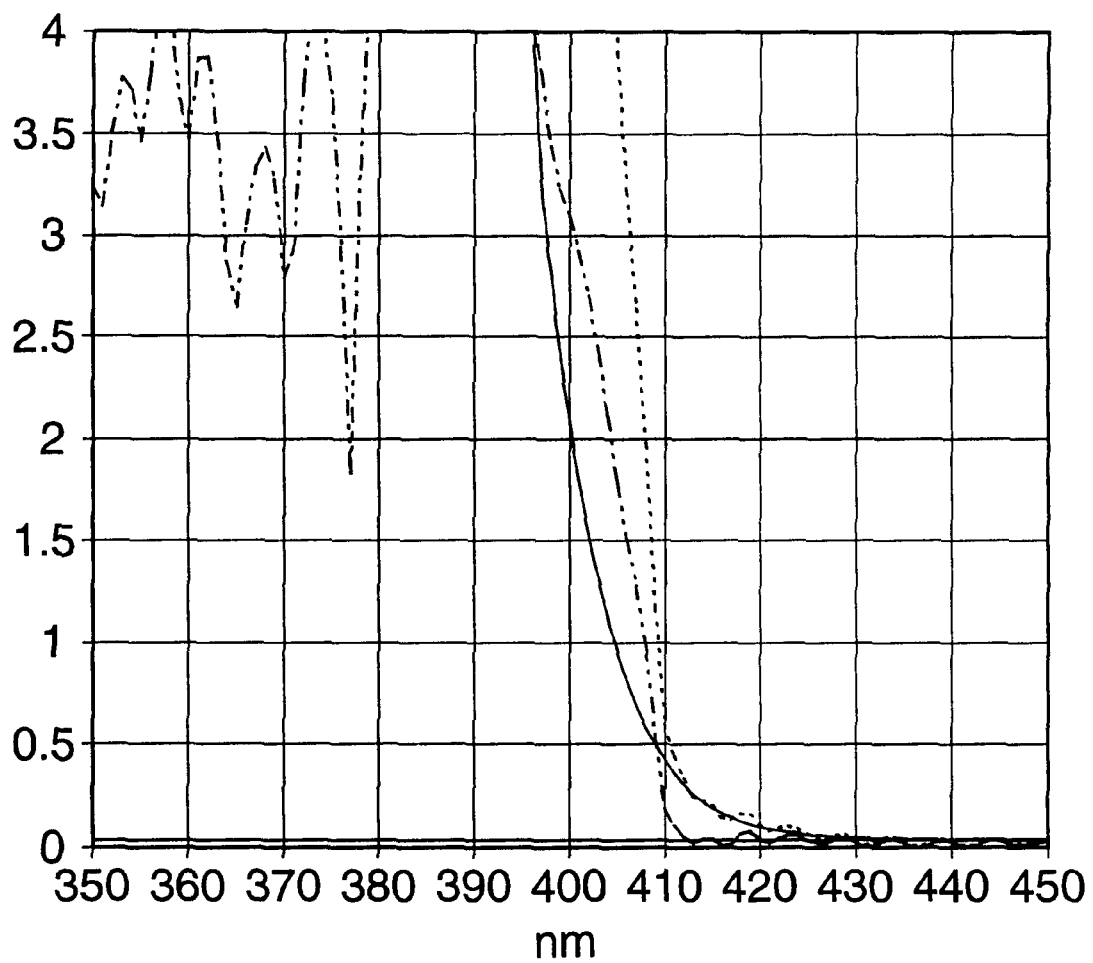
FIG. 11 is a graph of optical density (y-axis) versus wavelength (x-axis) for (a) a UF-5 acrylic ⅛" filter (ELF-Atochem, Philadelphia, Pa.) (solid line); (b) a combination of two multilayer optical films of FIG. 10 (dashed/dotted line); and (c) a combination of the UF-5 acrylic filter between two multilayer optical films of FIG. 10 (dotted line), where lines (b) and (c) are both calculated based on a model.

FIG. 10 illustrates modeled transmission and reflection spectra for a multilayer polymeric optical film with alternating layers made of polyethylene terephthalate (PET) and poly(ethylene-co-vinyl acetate) (EVA). FIG. 11 illustrates the modeled extinction spectra for a) a commercial absorber, b) two of the modeled multilayer polymeric optical films of FIG. 10 laminated together, and c) the combination of the commercial absorber between the two multilayer polymeric optical films. As illustrated, the absorber/multilayer polymeric optical film combination has a significantly sharper band edge (e.g., the transition from optical density of 2 to optical density of 0.3).

Figure 12:
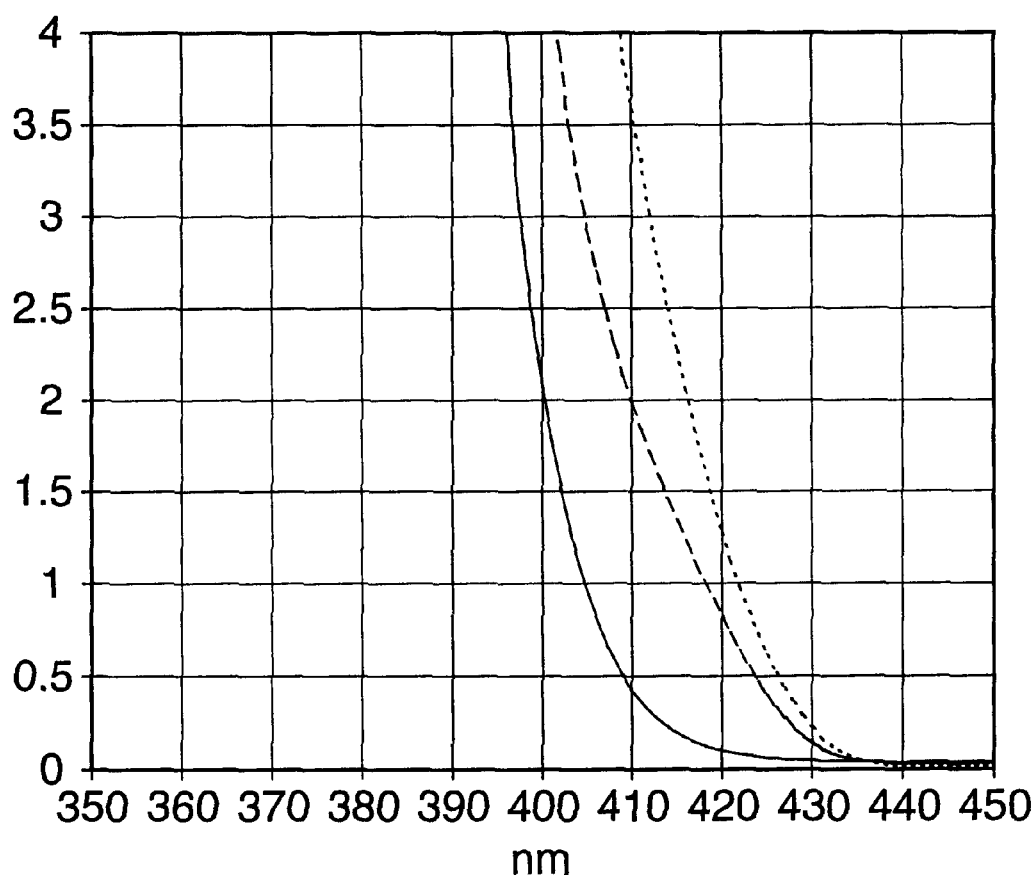
FIG. 12 is a graph of optical density (y-axis) versus wavelength (x-axis) for (a) a UF-5 acrylic ⅛" filter (ELF-Atochem, Philadelphia, Pa.) (solid line); (b) a combination of the UF-5 acrylic filter and one multilayer dielectric UV cutoff filter (420 nm cutoff, special order, Unaxis Optics Deutschland GmbH, Germany) (dashed line); and (c) a combination of the UF-5 acrylic filter between two multilayer dielectric UV cutoff filters (dotted line)
Figure 13:
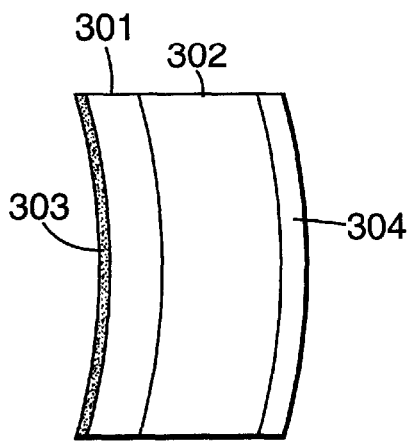
FIG. 13 is a schematic cross-section of a first embodiment of a lens assembly, according to the invention.
Figure 14:
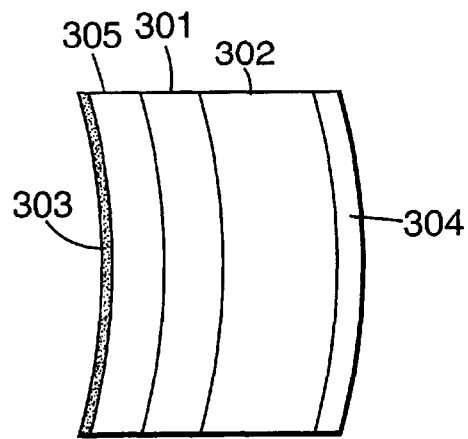
FIG. 14 is a schematic cross-section of a second embodiment of a lens assembly, according to the invention.
Figure 15:
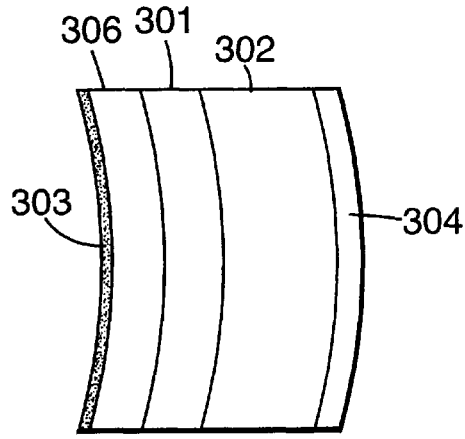
FIG. 15 is a schematic cross-section of a third embodiment of a lens assembly, according to the invention.
Figure 16:
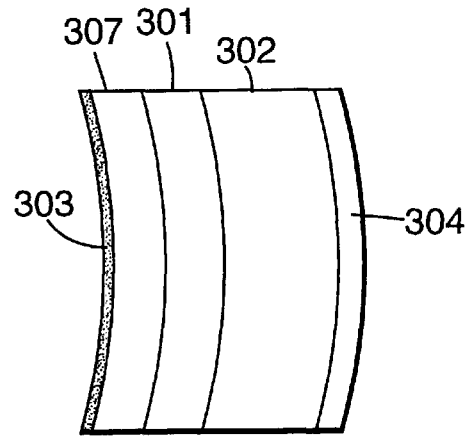
FIG. 16 is a schematic cross-section of a fourth embodiment of a lens assembly, according to the invention.

As another example, FIG. 12 illustrates absorption spectra for a) a commercial absorber, b) a combination of a commercial absorber and one commercial reflective film, and c) the combination of a commercial absorber between two commercial reflective films. Again, the band edge for the combination of an absorber between two reflective films is significantly narrower (e.g., the transition from an optical density of 2 to an optical density of 0.1).

Laser Light Filter Applications

The use of high-powered laser devices in industry, research, transportation, targeting, identification, commerce, and other settings is becoming increasingly prevalent. These lasers can pose a serious threat to the eyes of persons in the vicinity of the laser. A number of approaches have been used to prevent harmful laser radiation from reaching the human eye. One such approach is the use of a clear polymer loaded with a dye or other material that absorbs the laser radiation. Although laser light filters can be designed to block specific narrow wavelength bands, the use of tunable lasers or different types of lasers can require broadband protection. The use of a broadband absorbing filter, however, typically also reduces the transmission of visible light. For example, broadband IR absorbing films with an optical density greater than 4 might have a visible transmission, $T_{vis}$, of less than 40%.

$T_{vis}$, is defined herein as the photopic transmission computed for a standard 1931 CIE 2-degree observer. The transmission spectrum $T(\lambda)$ is multiplied by the photopic weight function $V(\lambda)$ (defined by the CIE in 1931 for an observer with a 2-degree field of view) and also by the spectral density of the CIE defined D65 illuminant $S(\lambda)$ and integrated over all visible wavelengths (380–780 nm): $T_{vis}=\Sigma T(\lambda)V(\lambda)S(\lambda)$. The result is then normalized through division by the photopic transmission computed with no filter present, i.e. with $T(\lambda)=1$. Other definitions of $T_{vis}$ are available and used for particular applications.

The multilayer reflective elements described above, including the polymeric multilayer optical films and the cholesteric liquid crystal optical films, can be used for laser protective eyewear and other applications, such as windows and aircraft canopies. FIGS. 13–20 illustrate a number of possible lens assembly configurations for laser protective eyewear and other applications. Typically, the eyewear includes a multilayer reflective element 301 disposed on a substrate 302. The substrate 302 can be formed using any lens material or other transparent surface, including impact resistant materials, such as polycarbonate, that can provide projectile protection. The multilayer reflective element 301 is disposed on the lens or lenses or other transparent surface using, for example, optical adhesive. One advantage of using polymeric multilayer optical films for the reflective elements is that these films can typically be formed and placed on curved lenses.

Other optional layers, films, and coatings, such as, for example, an anti-fogging layer 303 (FIGS. 13–20), a scratch resistant layer 304 (FIGS. 13–20), an absorptive layer 305 (FIGS. 14 and 19), an inorganic multilayer optical film 306 (FIG. 15), a holographic reflecting film 307 (FIG. 16), and other layers, films, and coatings, can be applied to the lens or lenses or other transparent surface.

Figure 17:
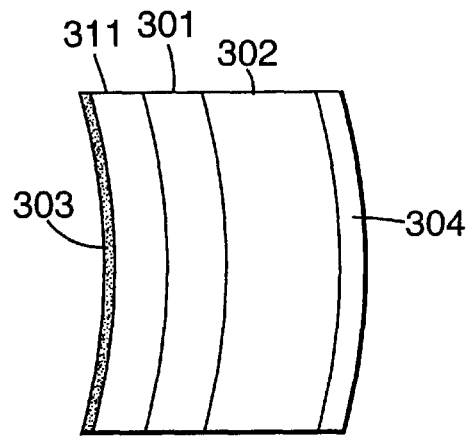
FIG. 17 is a schematic cross-section of a fifth embodiment of a lens assembly, according to the invention.
Figure 18:
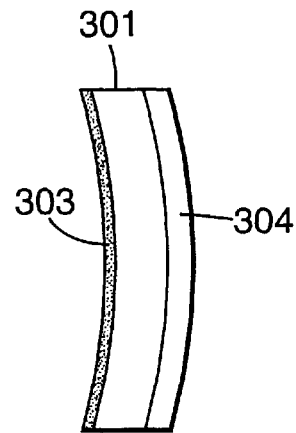
FIG. 18 is a schematic cross-section of a sixth embodiment of a lens assembly, according to the invention.
Figure 19:
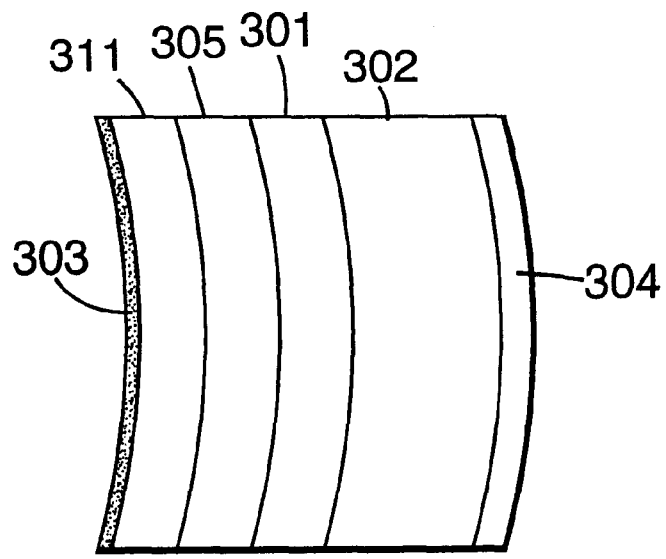
FIG. 19 is a schematic cross-section of a seventh embodiment of a lens assembly, according to the invention.
Figure 20:
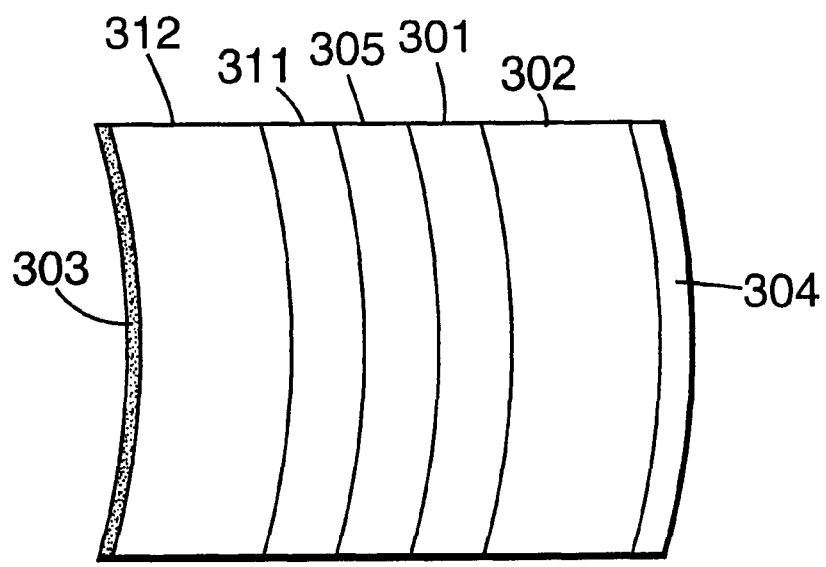
FIG. 20 is a schematic cross-section of a eighth embodiment of a lens assembly, according to the invention.

In some instances, the multilayer reflective element 301 can be used without a substrate, as illustrated in FIG. 18. In other embodiments, as illustrated in FIGS. 17, 19, and 20, a second multilayer reflective element 311 is disposed over the first multilayer reflective element 301, optionally, with an absorptive element 305 or a non-absorptive cavity (not shown) between the two reflective elements 301, 311. A second substrate 312 can optionally be used to provide more support or additional projectile protection, as illustrated in FIG. 20. In addition to eyewear, such as glasses, goggles, visors, and masks, the assemblies illustrated in FIGS. 13 to 20 can be adapted for use with windows, aircraft canopies, and other similar articles.

Figure 21:
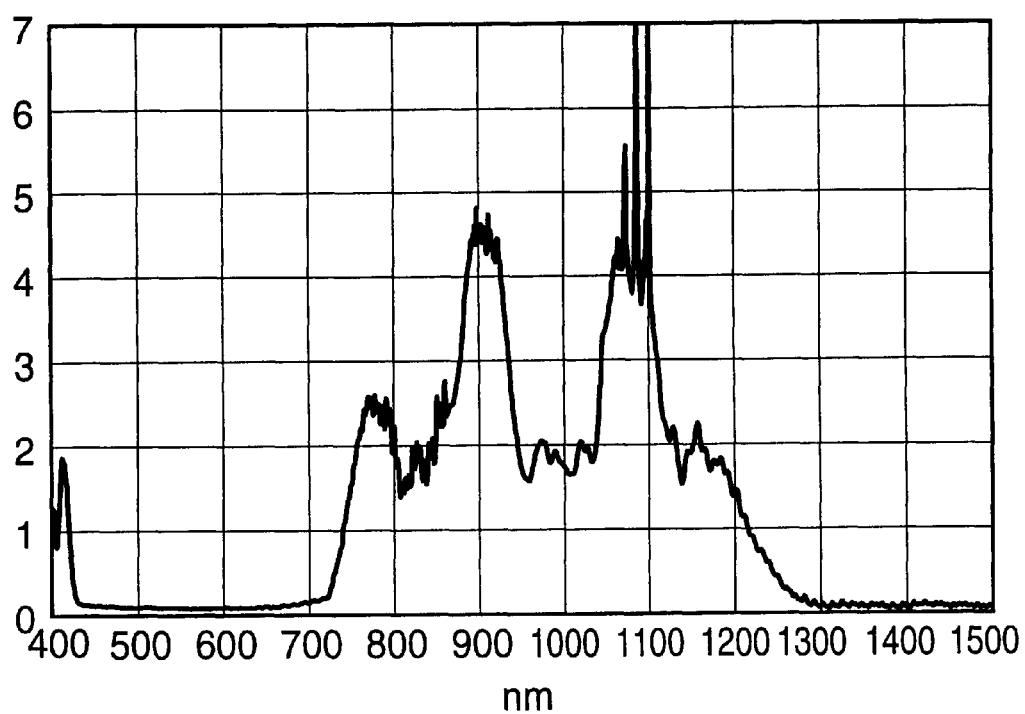
FIG. 21 is a graph of measured optical density (y-axis) versus wavelength (x-axis) of a polymeric multilayer optical film composed of 448 alternating co-polyethylene naphthalate (a copolymer including 90 wt. % naphthalate units and 10 wt. % terephthalate units for the carboxylate portion of the polyester) and poly(methyl methacrylate) (PMMA) layers with an approximately linear thickness gradient ranging from about 0.2 to 0.35 μm per pair of layers.

The combination of an absorptive element between two reflective elements, as described above, can be used to obtain high optical density with good visible transmission. FIGS. 21 through 28 illustrate measured and calculated optical density spectra and other properties for a several optical filters. The reflective elements are polymeric multilayer optical films with 448 alternating layers of co-polyethylene naphthalate (a copolymer including 90 wt. % naphthalate units and 10 wt. % terephthalate units for the carboxylate portion of the polyester) and poly(methyl methacrylate) (PMMA). The layers were grouped into two packets of 224 layers each. The second packet was about 1.3 times thicker than the first. Both packets had a linear thickness gradient with the last co-polyethylene naphthalate layer being 1.4 times as thick as the first and the pairs of layers having a thickness ranging from about 0.2 to 0.35 $\mu$m. This polymeric multilayer optical film has an optical density greater than about 1.5 from about 750 to 1200 nm. The measured optical density spectra of these reflective elements is illustrated in FIG. 21.

Figure 22:
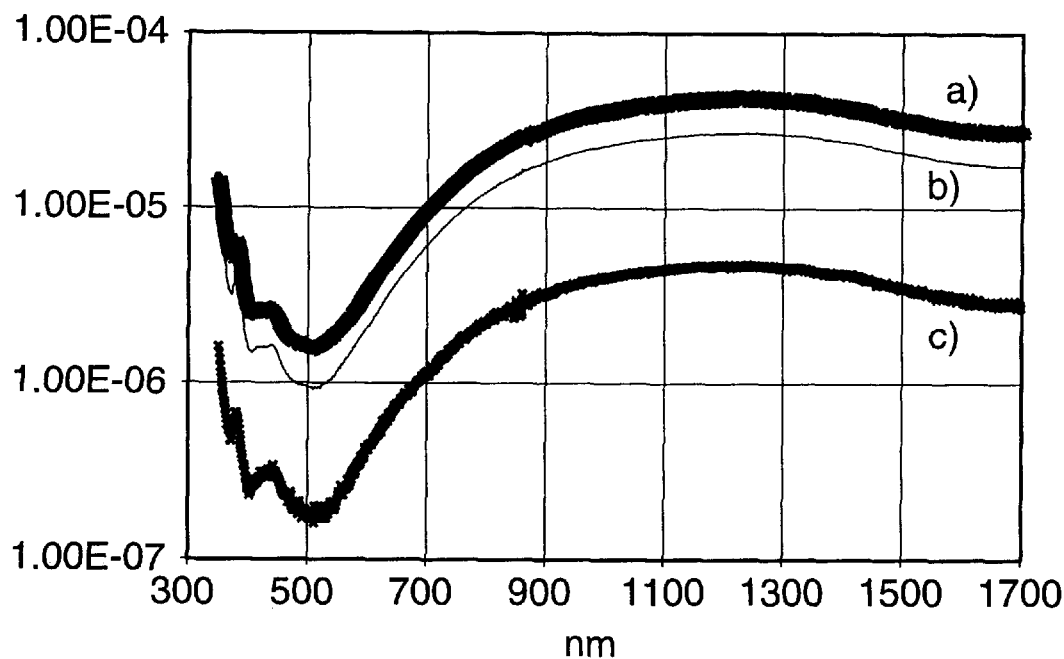
FIG. 22 is a graph of the imaginary part of the index of refraction (y-axis) versus wavelength (x-axis) for three absorptive elements: (a) Optifloat™ Blue 21, (b) Optifloat™ Green 58, and (c) Optifloat™ Green 90, available from Pilkington, plc (St. Helens, Great Britain), at 2.1 mm thickness.
Figure 23:
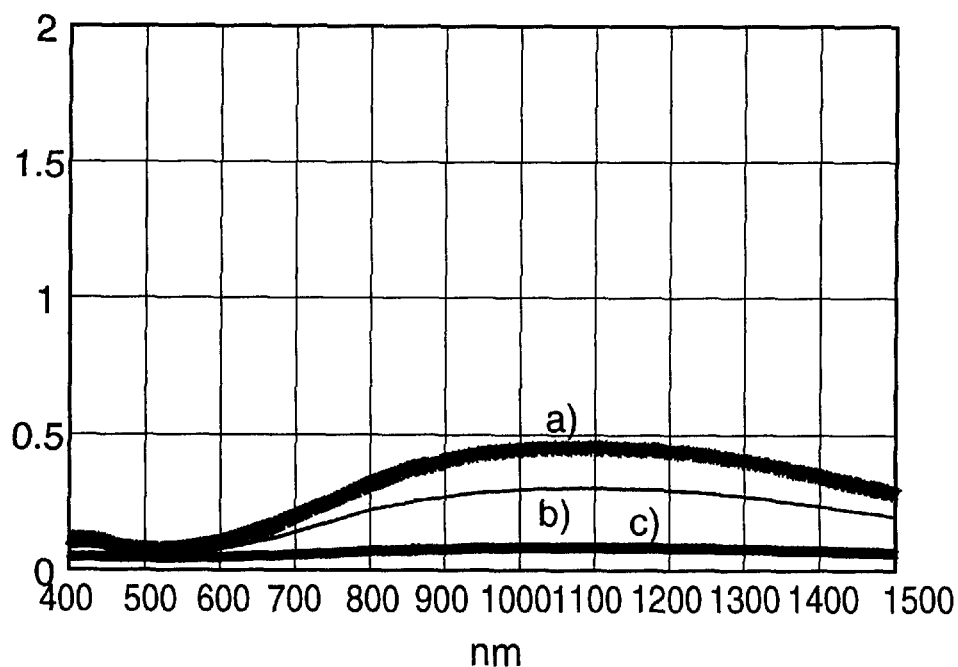
FIG. 23 is a graph of the optical density (y-axis) versus wavelength (x-axis) for the three absorptive elements of FIG. 22.

Three different absorptive elements were used in these examples; Optifloat™ Blue 21, Optifloat Green 58, and Optifloat™ Green 90 glass available from Pilkington, plc (St. Helens, Great Britain). The dispersive values of n" (the imaginary part of the index of refraction) and the optical density spectra for each absorbing element are shown in FIGS. 22 and 23, respectively.

Figure 24:
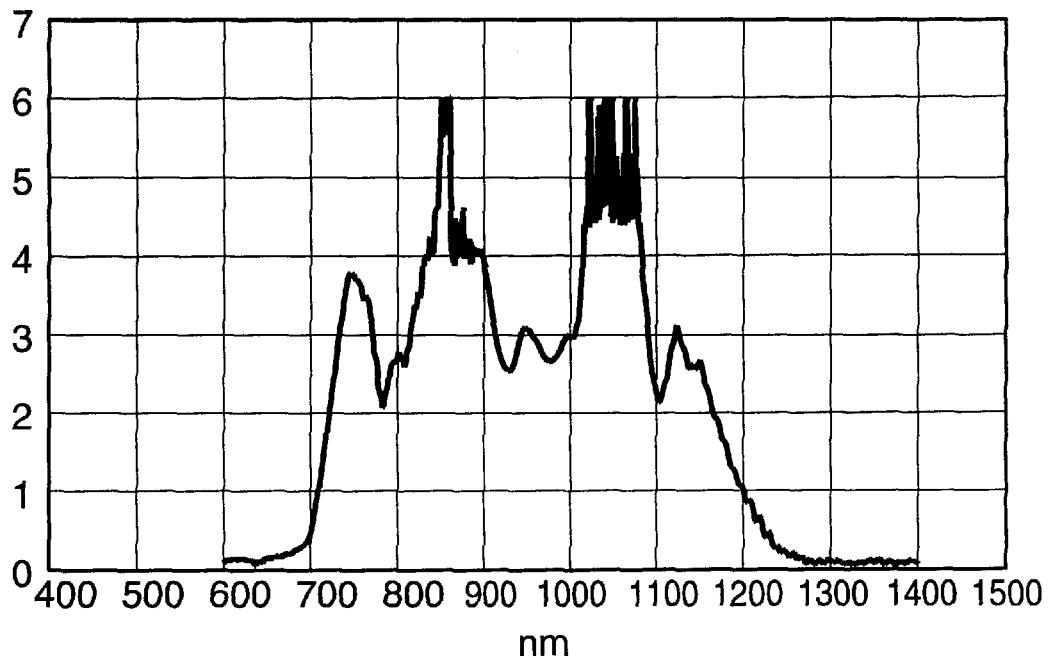
FIG. 24 is a graph of the measured optical density (y-axis) versus wavelength (x-axis) for an optical filter with two of the polymeric multilayer optical films of FIG. 21 laminated into a single optical body.

FIG. 24 shows a measured optical density spectrum for a combination of two reflective elements of FIG. 21 laminated into a single optical filter. In this instance, the optical density for the two reflective elements in combination is only modestly improved over a singe reflective element (see FIG. 21).

Figure 25:
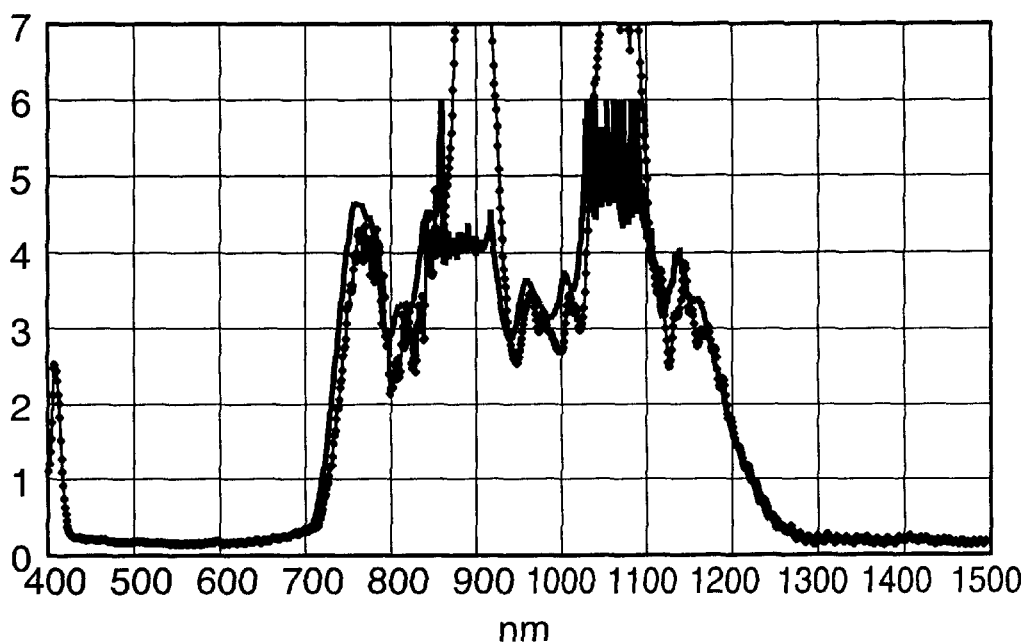
FIG. 25 is a graph of the measured (dark line) and calculated (circles) optical density (y-axis) versus wavelength (x-axis) for an optical filter with the absorptive element Optifloat™ Blue 21 of FIG. 22 between two of the polymeric multilayer optical films of FIG. 21.

FIG. 25 shows a comparison of measured and calculated optical density spectra for the configuration of FIG. 1, where the absorptive element 106 is Optifloat™ Blue 21. In this instance, the modest absorption of the Optifloat™ Blue 21 absorptive element in the 900 to 1500 nm wavelength region provides a discernable increase in the optical density over this wavelength region while leaving the transmission in the visible region quite high ($T_{vis}$=70%).

Figure 26:
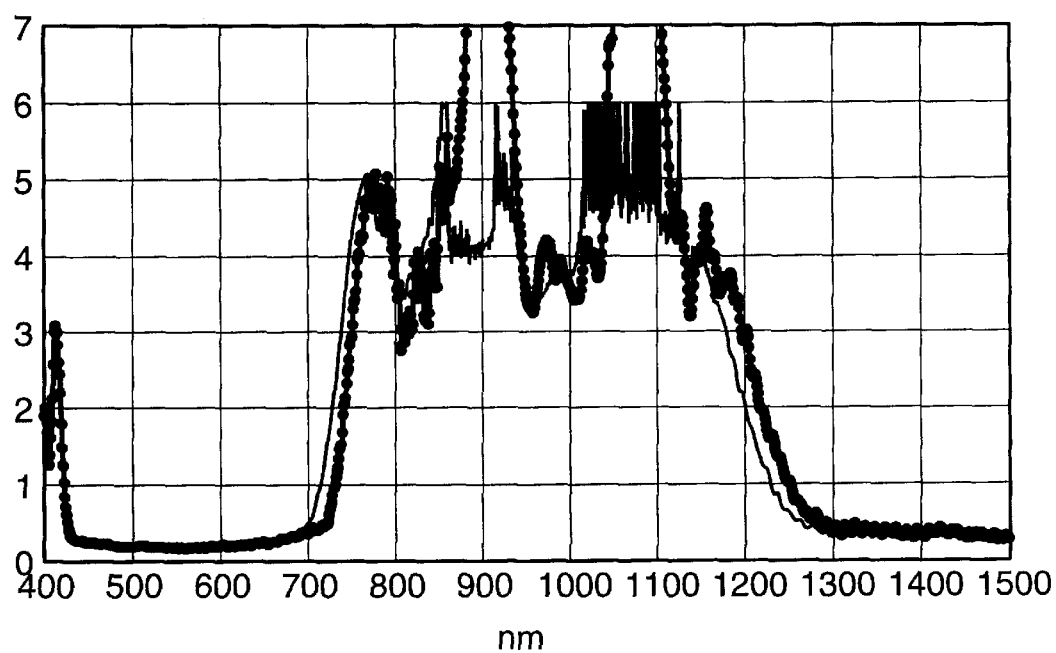
FIG. 26 is a graph of the measured (dark line) and calculated (circles) optical density (y-axis) versus wavelength (x-axis) for an optical filter with the absorptive element Optifloat™ Green 58 of FIG. 22 between two of the polymeric multilayer optical films of FIG. 21.

FIG. 26 shows a comparison of measured and calculated optical density spectra for the configuration of FIG. 1 where the absorptive element 106 is Optifloat™ Green 58. Here, the increased loss in the Optifloat™ Green 58 absorptive element (compared with the Optifloat™ Blue 21 absorptive element) results in a substantially higher optical density in the high reflection region of the reflective elements. The visible transmission remains quite high ($T_{vis}$=66%).

Figure 27:
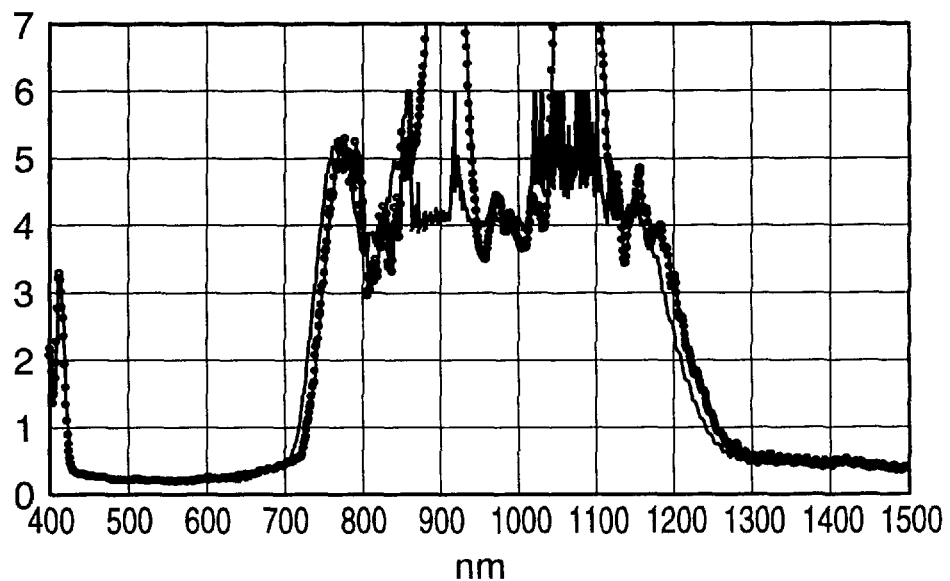
FIG. 27 is a graph of the measured (dark line) and calculated (circles) optical density (y-axis) versus wavelength (x-axis) for an optical filter with the absorptive element Optifloat™ Green 90 of FIG. 22 between two of the polymeric multilayer optical films of FIG. 21.

FIG. 27 shows a comparison of measured and calculated optical density spectra for the configuration of FIG. 1 where the absorptive element 106 is Optifloat™ Green 90. Here the optical density averages about 4 in the high reflection region, demonstrating an increase of about 1.5 to 2 in optical density compared with the two laminated reflectors with no absorptive layer. The measured optical density is greater than 3.5 over a wavelength range stretching from 750 to 1180 nm. Again the visible transmission remains high ($T_{vis}$=64%), with only a slight reduction coming with the benefit a very substantial IR transmission reduction. Such broadly absorbing pigments as those illustrated in FIGS. 25, 26, and 27 can be less costly than IR specific dyes and forming a combination with the reflective elements requires less pigment to obtain the desired optical density.

Figure 28:
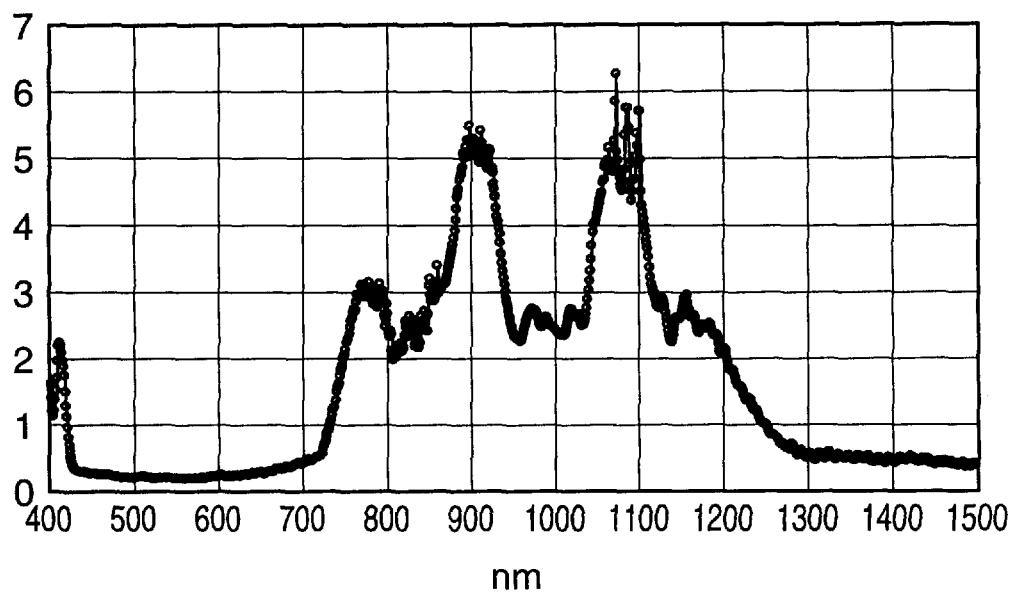
FIG. 28 is a graph of the calculated optical density (y-axis) versus wavelength (x-axis) for an optical filter with the absorptive element Optifloat™ Green 90 of FIG. 22 before (circles) or behind (solid line) two of the polymeric multilayer optical films of FIG. 21.

The uniqueness of the optical filter configuration of FIG. 1 can be seen from FIG. 28. Here the three elements have been placed in two other configurations, absorptive/reflective/reflective (circles) and reflective/reflective/absorptive (line). The calculated optical density spectra for these two configurations are little different than for the case of two reflective elements without an absorptive element.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. An optical filter, comprising:
   a first reflective element;
   a second reflective element, wherein the second reflective element has a band edge within about 25 nm of a band edge of the first reflective element; and
   a lossy element disposed between the first and second reflective elements, wherein the lossy element causes the loss of at least some light within the band edge of at least one of the first and second reflective elements, wherein the optical filter has an optical density of at least 3 over a wavelength range from 750 to 1180 nm and a visible transmission of at least 64%.

2. The optical filter of claim 1, wherein the band edge of the first and second reflective elements extends from an optical density of 0.3 to an optical density of 2.

3. The optical filter of claim 1, wherein the band edges of the first and second reflective elements overlap.

4. The optical filter of claim 1, wherein a band edge of the lossy element overlaps with the band edges of at least one of the first and second reflective elements.

5. The optical filter of claim 1, wherein the lossy element is laminated to the first reflective element.

6. The optical filter of claim 5, wherein the second reflective element is laminated to the lossy element.

7. The optical filter of claim 1, wherein, over a wavelength range, the first and second reflective elements substantially reflect light having a first polarization and substantially transmit light having a second polarization.

8. The optical filter of claim 1, wherein a band edge of the lossy element is within 25 nm of the band edge of at least one of the first and second reflective elements.

9. An article, comprising:
   at least one transparent substrate; and
   an optical film disposed over a major surface of the at least one transparent substrate, the optical film comprising:
   a first multilayer reflective film;
   a second multilayer reflective film; and
   a lossy element disposed between the first and second multilayer reflective films;
   wherein the article has an optical density of at least 3 over a wavelength range from 750 to 1180 nm and a visible transmission of at least 64%.

10. The article of claim 9, wherein the at least one transparent substrate comprises at least one lens.

11. The article of claim 10, wherein the lens comprises an impact resistant plastic material.

12. The article of claim 9, wherein the article has an optical density of at least 3.5 over a wavelength range from 750 to 1180 nm.

13. The article of claim 9, wherein at least one of the first and second multilayer reflective films is a multilayer polymeric film.

14. The article of claim 9, wherein at least one of the first and second multilayer reflective films is a multilayer inorganic film.

15. The article of claim 9, wherein at least one of the first and second multilayer reflective films is a cholesteric liquid crystal optical film.

* * * * *

UNITED STATES PATENT AND TRADEMARK OFFICE
CERTIFICATE OF CORRECTION

PATENT NO. : 6,697,195 B2
DATED : February 24, 2004
INVENTOR(S) : Weber, Michael F.

It is certified that error appears in the above-identified patent and that said Letters Patent is hereby corrected as shown below:

Title Page,
Item [62], Related U.S. Application Data, delete "07/642,717" and insert in place thereof -- 09/642,717 --.

Column 15,
Line 61, delete "$T_{vis}$," and insert in place thereof -- $T_{vis}$ --.

Column 16,
Line 62, delete "Optifloat" and insert in place thereof -- Optifloat™ --.

Column 17,
Line 12, delete "discemable" and insert in place thereof -- discernable --.

Signed and Sealed this

Twenty-ninth Day of June, 2004

JON W. DUDAS
*Acting Director of the United States Patent and Trademark Office*